United States Patent [19]

Bliss et al.

[11] Patent Number: 5,802,118

[45] Date of Patent: Sep. 1, 1998

[54] SUB-SAMPLED DISCRETE TIME READ CHANNEL FOR COMPUTER STORAGE SYSTEMS

[75] Inventors: William G. Bliss, Thornton; David E. Reed, Westminster; Richard T. Behrens, Louisville, all of Colo.

[73] Assignee: Cirrus Logic, Inc., Fremont, Calif.

[21] Appl. No.: 681,578

[22] Filed: Jul. 29, 1996

[51] Int. Cl.⁶ ............................................. H04B 1/10
[52] U.S. Cl. ............................................. 375/350
[58] Field of Search ........................... 375/350, 355; 360/51, 65, 46

[56] References Cited

U.S. PATENT DOCUMENTS

| | | | |
|---|---|---|---|
| 4,866,647 | 9/1989 | Farrow. | |
| 4,979,040 | 12/1990 | Masaumoto | 358/138 |
| 5,048,060 | 9/1991 | Aria et al. | 375/106 |
| 5,063,445 | 11/1991 | Nishizawa et al. | 358/138 |
| 5,127,051 | 6/1992 | Chan et al.. | |
| 5,177,734 | 1/1993 | Cummisky et al.. | |
| 5,220,583 | 6/1993 | Solomon | 375/82 |
| 5,235,534 | 8/1993 | Potter. | |
| 5,258,933 | 11/1993 | Johnson et al.. | |
| 5,293,369 | 3/1994 | Melas et al.. | |
| 5,295,128 | 3/1994 | Hutchins et al.. | |
| 5,309,484 | 5/1994 | McLane et al.. | |
| 5,311,178 | 5/1994 | Pan et al.. | |
| 5,315,284 | 5/1994 | Bentley. | |
| 5,327,298 | 7/1994 | Ottesen et al.. | |
| 5,341,249 | 8/1994 | Abbott et al. | 360/46 |
| 5,359,631 | 10/1994 | Behrens et al.. | |
| 5,384,552 | 1/1995 | Iwasaki. | |
| 5,400,364 | 3/1995 | Yada. | |
| 5,422,760 | 6/1995 | Abbott et al. | 360/46 |
| 5,440,532 | 8/1995 | Yokogawa et al. | 369/32 |
| 5,481,568 | 1/1996 | Yada. | |
| 5,521,767 | 5/1996 | Weng et al.. | |
| 5,521,945 | 5/1996 | Knudson. | |
| 5,526,200 | 6/1996 | Yada | 360/51 |
| 5,541,783 | 7/1996 | Yamamoto et al. | 360/48 |
| 5,642,243 | 6/1997 | Bliss | 360/51 |
| 5,654,835 | 8/1997 | Kusano | 360/51 |
| 5,696,639 | 12/1997 | Spurbeck et al. | 360/51 |

OTHER PUBLICATIONS

U.S application No. 08/546162, Spurbeck, et al. filed Oct. 20, 1995.

Roger Wood, "Turbo–PRML:A Compromise EPRML Detector" *IEEE Transactions On Magnetics*, vol. 29, No. 6, Nov. 1993.

Hideyuki Yamakawa, "SPERD: Simplified Partial Error Response Detection", *IEEE Inter Mag '95*, San Antonio, Texas, Apr. 1995.

Takushi Nishiya, "PERD: Partial Error Response Detection", *IEEE Inter Mag '95*, San Antonio, Texas, Apr. 1995.

(List continued on next page.)

*Primary Examiner*—Stephen Chin
*Assistant Examiner*—Mohammad Ghayour
*Attorney, Agent, or Firm*—Howard H. Sheerin; Dan A. Shifrin

[57] ABSTRACT

A sampled amplitude read channel is disclosed for reading binary data from a computer disk storage system, wherein the read channel sub-samples an analog read signal at a rate lower than the baud rate and detects the binary data from the sub-sampled values using a sequence detector. In one embodiment, the sub-sampled values are interpolated to generate synchronous sample values which are processed by a conventional sequence detector. In another embodiment, the sequence detector is modified to detect the binary data directly from the sub-sampled values. In yet another embodiment, the sequence detector comprises a remodulator and an error pattern detector for detecting and correcting bit errors in the detected binary data. In addition, for the various embodiments a channel code increases the distance property of the sequence detector in order to compensate for the degradation in performance caused by sub-sampling.

42 Claims, 23 Drawing Sheets

OTHER PUBLICATIONS

Takushi Nishiyan and Hideyuki Yamakawa, "PERD: Partial Error Response Detetion", *IEEE Transactions On Magnetics*, vol. 31, No. 6, Nov. 1995.

Jan W.M. Bergmans, "Partial Response Decoding of Rate ½ Modulation Codes for Digital Storage" *IEEE Transactions On Communications*, vol. 39, No. 11, pp. 1569–1581, Nov. 1991.

Jan W.M. Bergmans, "A Partial Receiver For Miller–Squared Encoded Signals with Half the Usual Operating Speed", *IEEE Transactions On Magnetics*, vol. 26, No. 5, Sep. 1990.

J. Moon and B. Brickner, "Maximum Transition Run Codes For Data Storage Systems", *IEEE Inter Mag.*, Seattle, WA., Apr. 1996.

William Bliss and David E. Reed, "Analysis of HDD Thin–Film–Head Read Channel Performance as a Function of Media Thickness and RLL Code d Constraint", *IEEE Inter Mag '96*, Seattle, WA., Apr. 1996.

Razmik Karabed and Paul Siegel, "Coding For High Order Partial Response Channels", *SPIE—Proceedings*, 23–24 Oct. 1995, Philidelphia, PA., vol. 2605.

Ronald E. Chrochiere and Lawrence R. Rabiner, *Mulirate Digital Signal Processing*, 1983, Prentice–Hall, pp. 127–192.

C.M. Melas, P. Sutardja, "An Asynchronous Fully Digital Channel for Magnetic Recording," *IEEE Globecom '94*, vol. 2 of 3, pp. 1144–1147, 1994.

Floyd M. Gardner, "Interpolation in Digital Modems—Part I; Fundamentals", *IEEE Transactions on Communications*, vol. 41, No. 3, Mar. 1993.

Floyd M. Gardner, "Interpolation in Digital Modems—Part II: Implementation and Performance", *IEEE Transactions on Communications*, vol. 41, No. 6, Jun. 1993.

NRZ

PR 4

EPR 4

SUB-SAMPLED DISCRETE TIME READ CHANNEL FOR COMPUTER STORAGE SYSTEMS

FIELD OF INVENTION

The present invention relates to the control of storage systems for digital computers (such as magnetic and optical disk drives), particularly to a sampled amplitude read channel that employs asynchronous sub-sampling of an analog read signal.

CROSS REFERENCE TO RELATED APPLICATIONS AND PATENTS

This application is related to other co-pending U.S. patent applications, namely application Ser. No. 08/440,515 entitled "Sampled Amplitude Read Channel For Reading User Data and Embedded Servo Data From a Magnetic Medium," 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," Ser. No. 08/701,572 entitled "Improved Timing Recovery For Synchronous Partial Response Recording," and Ser. No. 08/533,797 entitled "Improved Fault Tolerant Sync Mark Detector For Sampled Amplitude Magnetic Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," and U.S. Pat. No. 5,424,881 entitled "Synchronous Read Channel." All of the above-named patent applications and patents are assigned to the same entity, and all are incorporated herein by reference.

BACKGROUND OF THE INVENTION

Computer storage systems (such as optical, magnetic, and the like) record digital data onto the surface of a storage medium, which is typically in the form of a rotating magnetic or optical disk, by altering a surface characteristic of the disk. The digital data serves to modulate the operation of a write transducer (write head) which records binary sequences onto the disk in radially concentric or spiral tracks. In magnetic recording systems, for example, the digital data modulates the current in a write coil in order to record a series of magnetic flux transitions onto the surface of a magnetizable disk. And in optical recording systems, for example, the digital data may modulate the intensity of a laser beam in order to record a series of "pits" onto the surface of an optical disk. When reading this recorded data, a read transducer (read head), positioned in close proximity to the rotating disk, detects the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. Consequently, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In a conventional peak detection read channel, analog circuitry detects peaks in the continuous time analog read signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the data tracks in the effort to increase data density, detection errors can also occur due to intersymbol interference (ISI), a distortion in the read signal caused by closely spaced, overlapping pulses. This interference can cause a peak to shift out of its bit cell, or its magnitude to decrease, resulting in a detection error. This ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate channel and aliasing noise. After sampling, a digital equalizer equalizes the sample values according to a desired partial response, and a discrete time sequence detector, such as a Viterbi detector, interprets the equalized sample values in context to determine a most likely sequence for the digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney,.Jr., "The Viterbi Algorithm", Proc. IEEE, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", IEEE Journal on Selected Areas in Communications, Vol. 10 No. 1, January 1992, pp.38–56; and Wood et al, "Viterbi Detection of Class IV Partial Response on a Magnetic Recording Channel", IEEE Trans. Commun., Vol. Com-34, No. 5, pp. 454–461, May 1986; and Coker Et al, "Implementation of PRML in a Rigid Disk Drive", IEEE Trans. on Magnetics, Vol. 27, No. 6, November 1991; and Carley et al, "Adaptive Continous-Time Equalization Followed By FDTS/DF Sequence Detection", Digest of The Magnetic Recording Conference, August 15–17, 1994, pp. C3; and Moon et al, "Constrained-Complexity Equalizer Design for Fixed Delay Tree Search with Decision Feedback", IEEE Trans. on Magnetics, Vol. 30, No. 5, September 1994; and Abbott et al, "Timing Recovery For Adaptive Decision Feedback Equalization of The Magnetic Storage Channel", Globecom'90 IEEE Global Telecommunications Conference 1990, San Diego, Calif., November 1990, pp.1794–1799; and Abbott et al, "Performance of Digital Magnetic Recording with Equalization and Offtrack Interference", IEEE Transactions on Magnetics, Vol. 27, No. 1, January 1991; and Cioffi et al, "Adaptive Equalization in Magnetic-Disk Storage Channels", IEEE Communication Magazine, Feb. 1990; and Roger Wood, "Enhanced Decision Feedback Equalization", Intermag'90.

The principles disclosed herein are applicable regardless as to the particular discrete time sequence detection method employed. The present invention applies to the above-identified sequence detection methods as well as others not mentioned, and even future techniques.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error estimate based on the difference between the estimated samples and the read signal samples. A PLL loop filter filters the phase error, and the filtered phase error operates to synchronize the channel samples to the baud rate.

Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

Partial response (PR) with Viterbi detection, as mentioned above, is a common method employed in sampled amplitude read channels for detecting the recorded digital data from the synchronous sample values. The most common Viterbi type sequence detection methods include: $d=0$ rate 8/9 PR4, a cost effective implementation requiring only two interleaves sliding threshold detectors; and $d=1$ rate 2/3 EPR4/EEPR4, an implementation which improves the bit error rate (BER) at higher densities but requires a more sophisticated add/compare/select (ASC) type of sequence detector.

The $d=1$ constraint in the EEPR4 read channels increases the minimum distance of the corresponding trellis code (and thus decreases the BER), and it reduces the complexity and cost of the sequence detector by reducing the number of states and allows further simplification by exploiting symmetry in the trellis model. However, there are drawbacks associated with a $d=1$ system.

Namely, in $d=1$ read channels, there is a decrease in user data rate due to the decrease in coding efficiency (rate 2/3 for $d=1$ as compared to rate 8/9 for $d=0$). Thus, in order to achieve higher user data rates the channel data rate (code bit rate) must be increased using faster, more complex timing recovery and A/D circuitry (i.e., a higher frequency timing recovery VCO and A/D converter). This is undesirable because it is not cost effective, and although particularly a problem in $d=1$ read channels due to the decrease in code rate, it will become a problem for $d=0$ read channels as the data rates are pushed even higher.

There is, therefore, a need for a sampled amplitude read channel for use in computer storage systems that can operate at high user data rates and densities without increasing the cost and complexity of the analog-to-digital converter, timing recovery VCO or sequence detector. Another aspect of the present invention is to employ a coding scheme that improves the performance of a $d=0$ read channel at higher user data densities when the analog read signal is sub-sampled.

SUMMARY OF THE INVENTION

A sub-sampled, discrete time read channel is disclosed for high data rate computer storage systems which operates by sampling the analog read signal asynchronously at a rate significantly lower than the channel baud rate (code bit rate); interpolating the asynchronous sample values to generate interpolated sample values substantially synchronized to the baud rate; and detecting the digital data from the interpolated sample values. To improve performance of an unconstrained read channel ($d=0$ read channel), which otherwise degrades significantly at higher data rates using the sub-sampling technique of the present invention, a coding scheme codes out the data sequences that cause degradation.

Because the read signal is sub-sampled rather than synchronously sampled, the bandwidth of the A/D need not increase to achieve higher user data rates. Furthermore, interpolated timing recovery obviates the need for a high bandwidth synchronized VCO. In fact, the VCO of the present invention changes frequency only when the read/write head transitions between data zones on the disk. (Zoned recording is a technique wherein the disk is partitioned into a predetermined number of zones; a predetermined number of the contiguous tracks on the disk are grouped into a zone; and the data rate is increased from the inner zone to the outer zone.) Still further, a coding scheme compensates for the performance loss at higher data rates due to sub-sampling by coding out the data sequences that cause degradation.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1:
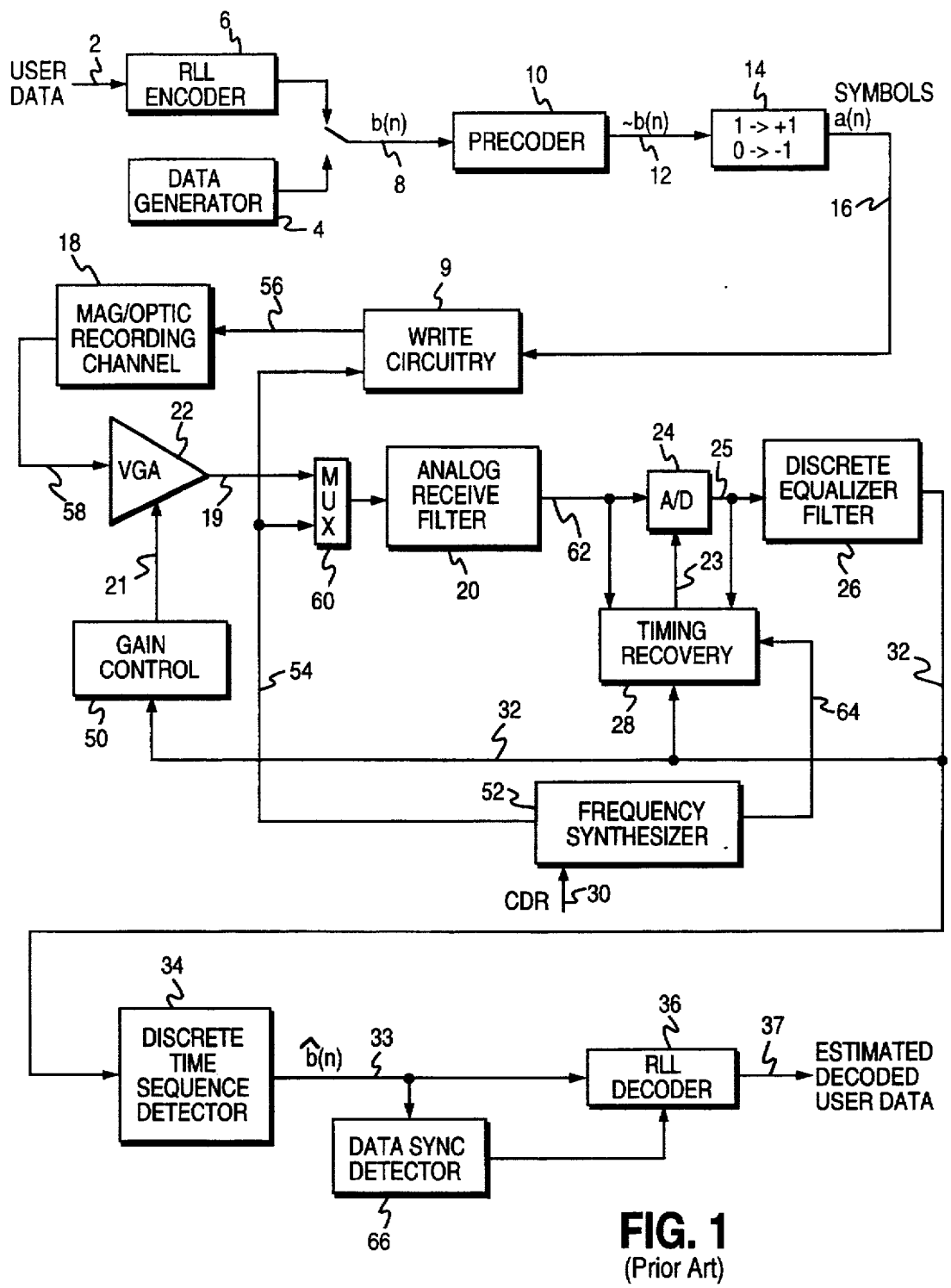
FIG. 1 is a block diagram of a conventional sampled amplitude read channel wherein timing recovery synchronizes the sampling of the analog read signal to the baud rate.

Referring now to FIG. 1, shown is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexer 60. Once locked to the write frequency, the multiplexer 60 selects the signal 19 from the read head as the input to the read channel in order to acquire an acquisition preamble recorded on the disk prior to the recorded user data. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1.

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. The channel data rate (CDR) 30 signal adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples 32 are also sent to a discrete time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 from the sequence detector 34 into estimated user data 37. A data sync detector 66 detects the sync mark 70 (shown in FIG. 2B) in the data sector 15 in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
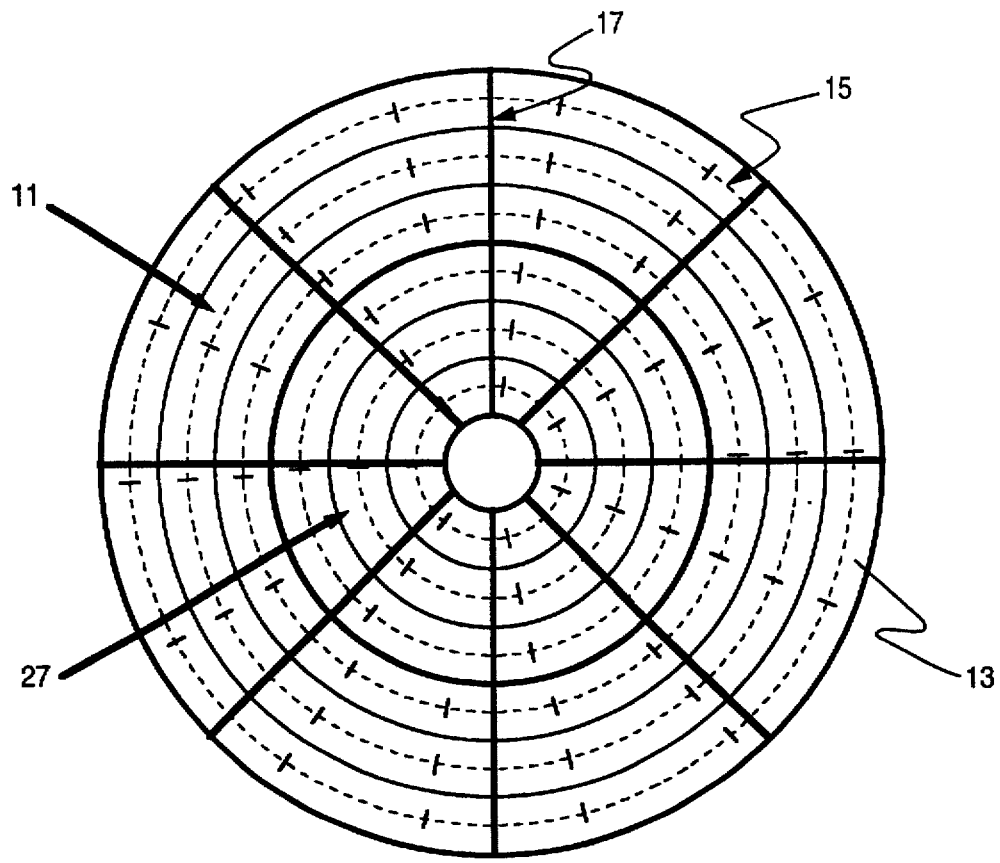
FIG. 2A shows an exemplary data format of a magnetic disk having a plurality of concentric tracks comprised of a plurality of user data sectors and embedded servo data sectors.

FIG. 2A shows an exemplary data format of a magnetic media comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The servo wedges 17 may be detected by a simple discrete time pulse detector or by the discrete time sequence detector 34. If the sequence detector 34 detects the servo data, then the format of the servo wedges 17 includes a preamble and a sync mark, similar to the user data sectors 15.

Figure 2B:
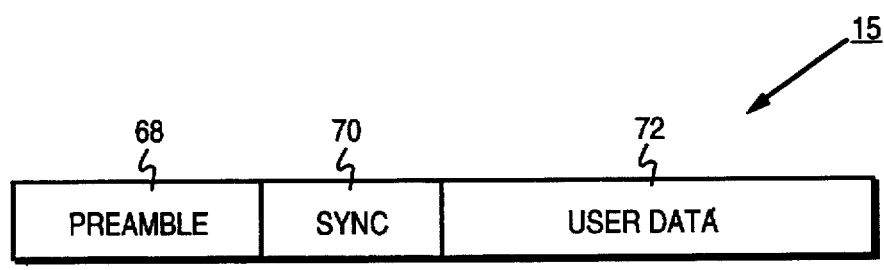
FIG. 2B shows an exemplary format of a user data sector.

FIG. 2B shows the format of a user data sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72.

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone.

Improved Sampled Amplitude Read Channel

Figure 3:
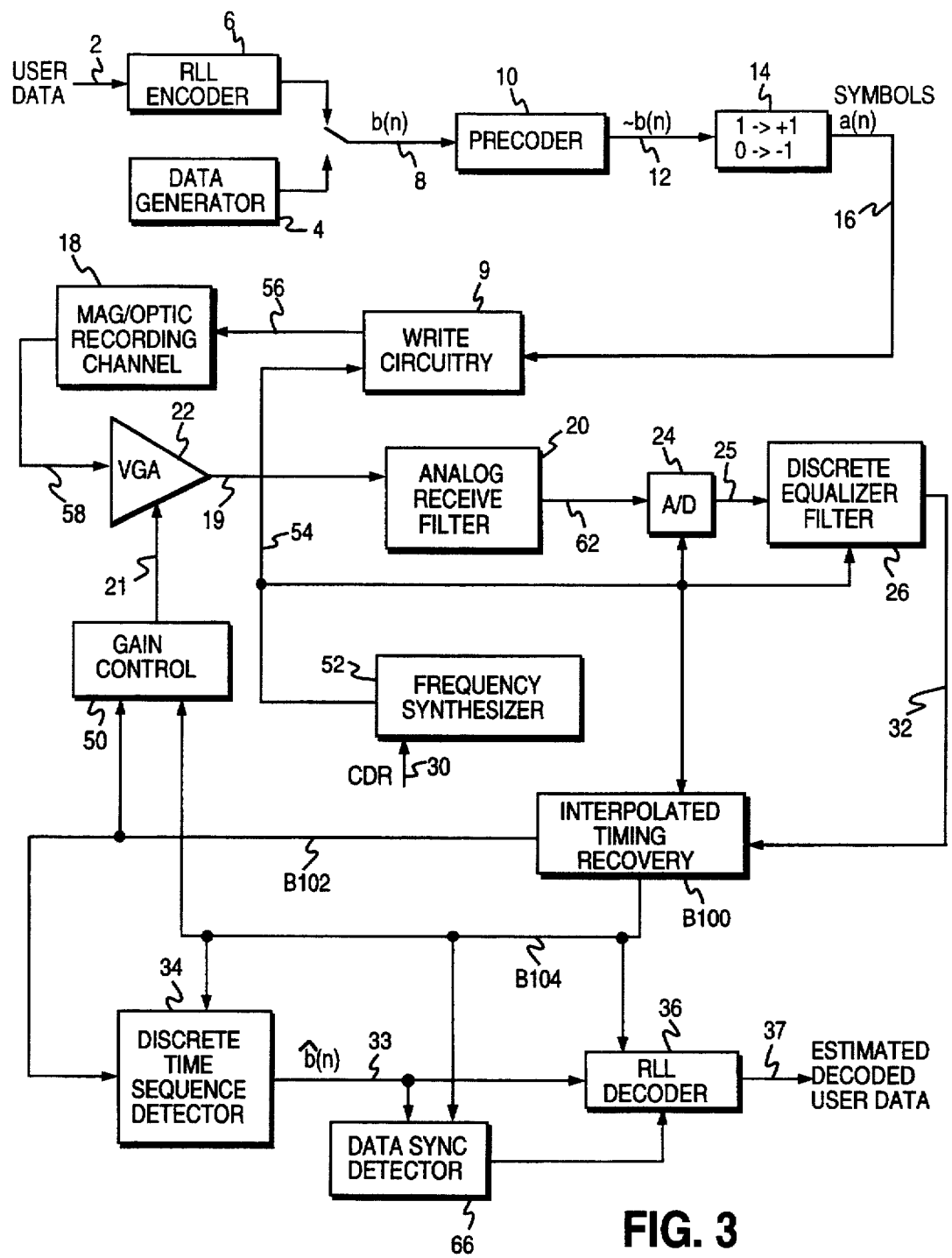
FIG. 3 a block diagram of the improved sampled amplitude read channel of the present invention comprising interpolated timing recovery for generating interpolated sample values and a synchronous data clock for clocking operation of a discrete time sequence detector.

FIG. 3 shows the improved sampled amplitude read channel of the present invention wherein the conventional sampled timing recovery 28 of FIG. 1 has been replaced by interpolated timing recovery B100. In addition, the write frequency synthesizer 52 generates a baud rate write clock 54 applied to the write circuitry 9 during a write operation, or an asynchronous read clock 54 for clocking the sampling device 24, the discrete time equalizer filter 26, and the interpolated timing recovery B100 at a frequency relative to the current zone (CDR 30) during a read operation. In an alternative embodiment, a first frequency synthesizer generates the write clock, and a second frequency synthesizer generates the read clock.

The interpolated timing recovery B100 interpolates the equalized sample values 32 to generate interpolated sample values B102 substantially synchronized to the data rate of the current zone. A discrete time sequence detector 34 detects an estimated binary sequence 33 representing the user data from the interpolated sample values B102 (synchronized sample values). Further, the interpolated timing recovery B100 circuit generates a frequency-synchronous data clock B104 for clocking operation of the gain control 50, discrete time sequence detector 34, sync mark detector 66 and RLL decoder 36.

Conventional Timing Recovery

Figure 4A:
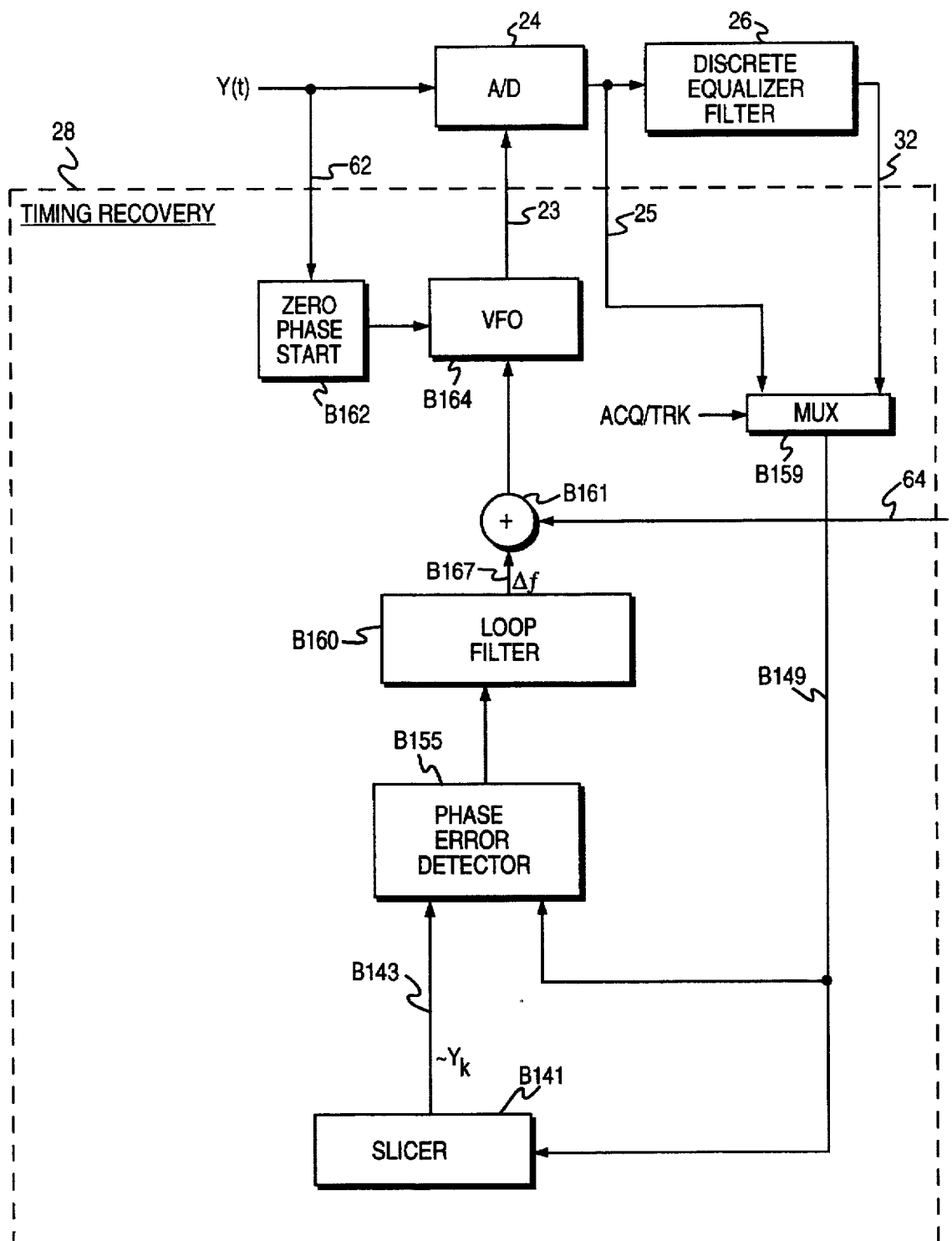
FIG. 4 is a detailed block diagram of the prior art sampling timing recovery comprising a synchronized sampling VFO.
FIG. 4B is a detailed block diagram of the interpolating timing recovery of the present invention comprising asynchronous sampling and an interpolator for generating interpolated sample values stantially synchronized to the baud rate.

An overview of the conventional sampling timing recovery 28 of FIG. 1 is shown in FIG. 4A. The output 23 of a variable frequency oscillator (VFO) B164 controls the sampling clock of a sampling device 24 which is typically an analog-to-digital converter (A/D) in digital read channels. A multiplexer B159 selects the unequalized sample values 25 during acquisition and the equalized sample values 32 during tracking, thereby removing the discrete equalizer filter 26 from the timing loop during acquisition in order to avoid its associated latency. A phase error detector B155 generates a phase error in response to the sample values received over line B149 and estimated sample values $\sim Y_k$ from a sample value estimator B141, such as a slicer in a d=0 PR4 read channel, over line B143. A loop filter B160 filters the phase error to generate a frequency offset $\Delta f$ B167 that settles to a value proportional to a frequency difference between the sampling clock 23 and the baud rate. The frequency offset $\Delta f$ B167, together with the center frequency control signal 64 from the frequency synthesizer 52, adjust the sampling clock 23 at the output of the VFO B164 in order to synchronize the sampling to the baud rate.

A zero phase start B162 circuit suspends operation of the VFO B164 at the beginning of acquisition in order to minimize the initial phase error between the sampling clock 23 and the read signal 62. This is achieved by disabling the VFO B164, detecting a zero crossing in the analog read signal 62, and re-enabling the VFO 164 after a predetermined delay between the detected zero crossing and the first baud rate sample.

Interpolated Timing Recovery

Figure 4B:
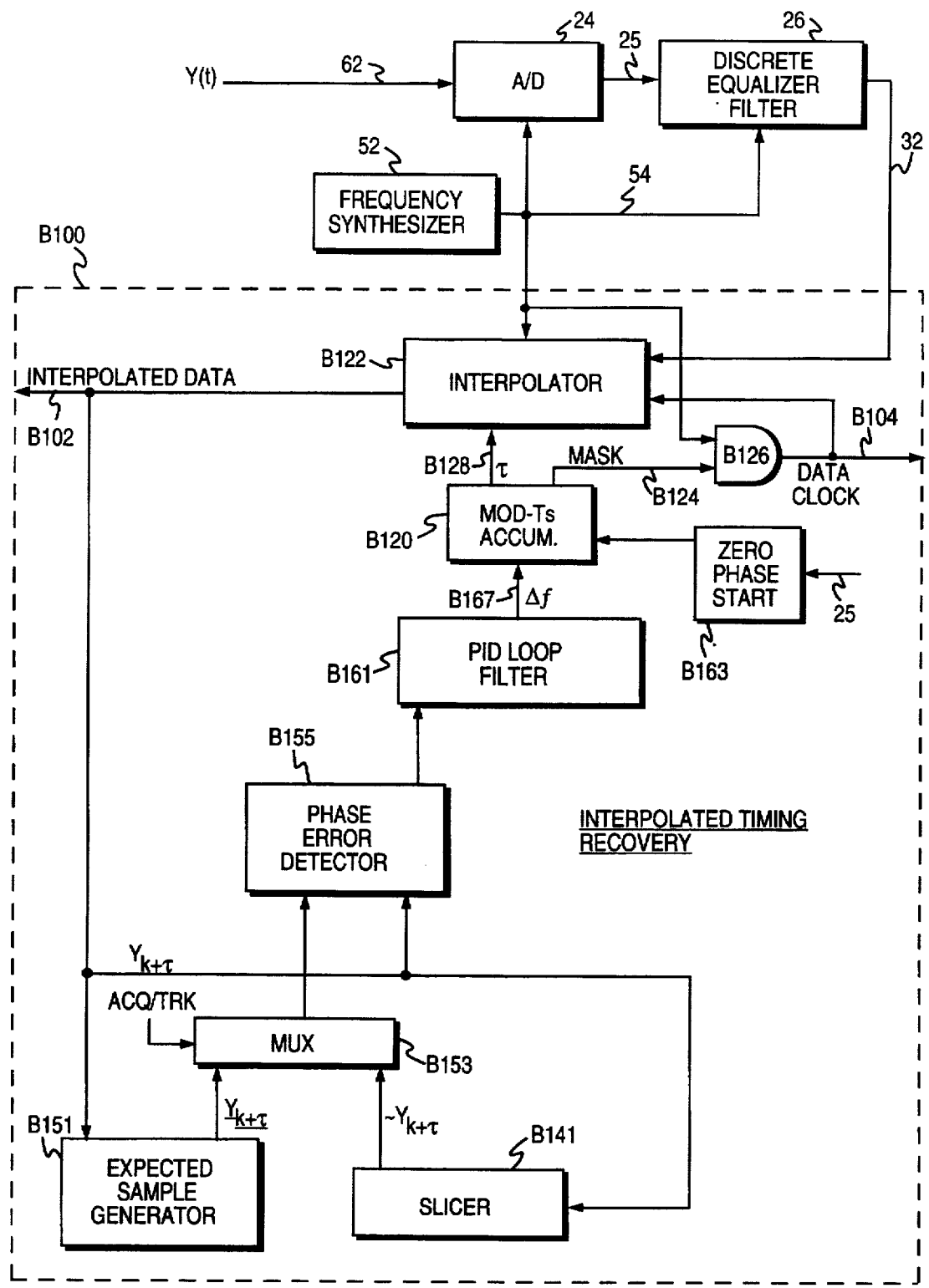

The interpolated timing recovery B100 of the present invention is shown in FIG. 4B. The VFO B164 in the conventional timing recovery of FIG. 4A is replaced with a modulo-Ts accumulator B120 and an interpolator B122. In addition, an expected sample value generator B151, responsive to interpolated sample values B102, generates expected samples $Y_{k+\tau}$ used by the phase error detector B155 to compute the phase error during acquisition. A multiplexer B153 selects the estimated sample values $\sim Y_{k+\tau}$ from the slicer B141 for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

In the interpolated timing recovery of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer filter 26, together with their associated delays, have been removed from the timing recovery loop; it is not necessary to multiplex B159 around the equalizer filter 26 between acquisition and tracking. However, it is still necessary to acquire a preamble 68 before tracking the user data 72. To this end, a zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error $\tau$ from the A/D 24 sample values 25 and loads this initial phase error into the modulo-Ts accumulator B120.

A detailed description of the modulo-Ts accumulator B120, data clock B104, and interpolator B122 is provided in the following discussion.

Interpolator

Figure 5:
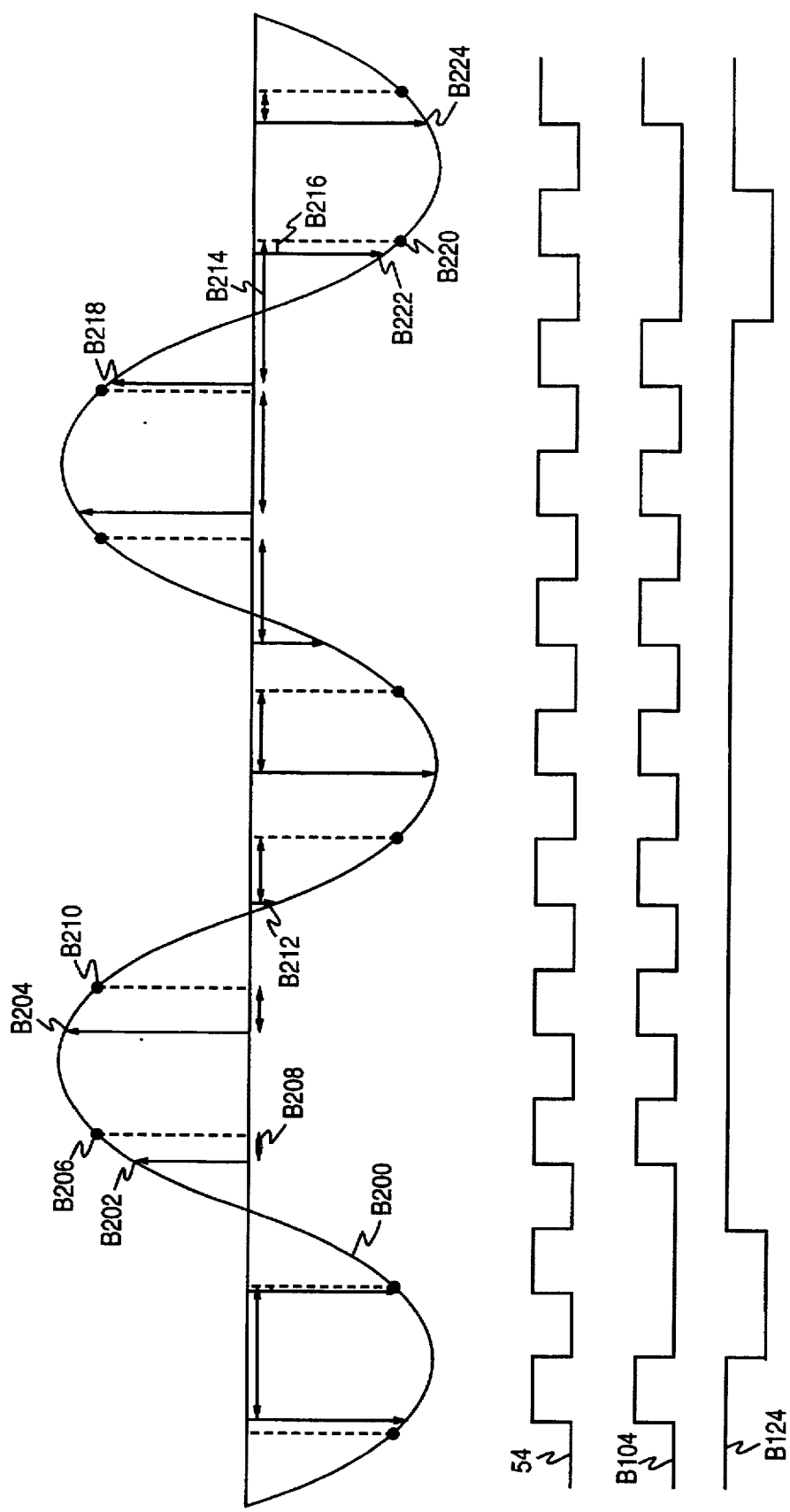
FIG. 5 illustrates the channel samples in relation to the interpolated baud rate samples when reading the acquisition preamble.

The interpolator B122 of FIG. 4B is understood with reference to FIG. 5 which shows a sampled 2T acquisition preamble signal B200. The target synchronous sample values B102 are shown as black circles and the asynchronous channel sample values 32 as vertical arrows. Beneath the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1) = x(N-1) + \tau \cdot (x(N-1)) \tag{1}$$

where $x(N-1)$ and $x(N)$ are the channel samples surrounding the target sample; and $\tau$ is an interpolation interval proportional to a time difference between the channel sample value $x(N-1)$ and the target sample value. The interpolation interval $\tau$ is generated at the output of modulo-Ts accumulator B120 which accumulates the frequency offset signal $\Delta f$ B167 at the output of the PID loop filter B161:

$$\tau = (\Sigma \Delta f) \text{MOD } TS \tag{2}$$

where Ts is the sampling period of the sampling clock 54. Since the sampling clock 54 samples the analog read signal 62 slightly faster than the baud rate, it is necessary to mask the data clock every time the accumulated frequency offset $\Delta f$, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval $\tau$ B208 is generated according to equation (2) above. The next interpolated sample value corresponding to the next target value B210 is computed from channel sample values B204 and B212. This process continues until the interpolation interval $\tau$ B214 would be greater than Ts except that it "wraps" around and is actually $\tau$ B216 (i.e., the accumulated frequency offset $\Delta f$, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of $\tau$:

$$C_\tau(e^{j\omega}) = e^{j\omega\tau} \tag{3}$$

which has an ideal impulse response:

$$\text{sinc } (\tau \cdot (n - \tau/T_s)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\bar{C}_\tau(e^{j\omega})X(e^{j\omega}) - C_\tau(e^{j\omega})X(e^{j\omega}) \tag{5}$$

where $\bar{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\bar{C}_\tau(e^{j\omega}) - e^{j\omega\tau}|^2 |X(e^{j\omega})|^2 d\omega \tag{6}$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} |\bar{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\bar{C}_\tau(e^{j\omega}) = \sum_{n=-R}^{n=R-1} C_\tau(n) e^{-j\omega n} \tag{8}$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 |X(e^{j\omega})|^2 d\omega. \tag{9}$$

The next step is to take the derivatives of equation (9) with respect to the coefficients $C_\tau(n)$ and set them to zero:

$$\frac{\partial E_{\tau,\alpha}^2}{\partial c_{\tau}(n_o)} = 0 \text{ for } n_0 = -R, \ldots, 0, 1, \ldots, R-1. \quad (10)$$

After careful manipulation, equation (10) leads to:

$$\int_{-\alpha\pi}^{\alpha\pi} \left[ \left( \sum_{n=-R}^{n=R-1} c_{\tau}(n)\cos(\omega(n_o - n)) \right) - \cos(\omega(n_o + \tau)) \right] |X(e^{j\omega})|^2 d\omega = 0 \quad (11)$$

for $n_o = -R, \ldots, 0, 1, \ldots, R-1$.

Defining $\phi(r)$ as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} c_{\tau}(n)\phi(n - n_o) = \phi(n_o + \tau) \quad (13)$$

for $n_o = -R, \ldots, 0, 1, \ldots, R-1$.

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [c_\tau(-R), \ldots, c_\tau(R-1)]^T$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \vdots \\ \vdots & & & \vdots \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^T. \quad (14)$$

The solution to equation (14) is:

$$C_\tau = \Phi_T^{-1} \Phi_\tau \quad (15)$$

where $\Phi_T^{-1}$ is an inverse matrix that can be solved using well known methods.

Figure 6:
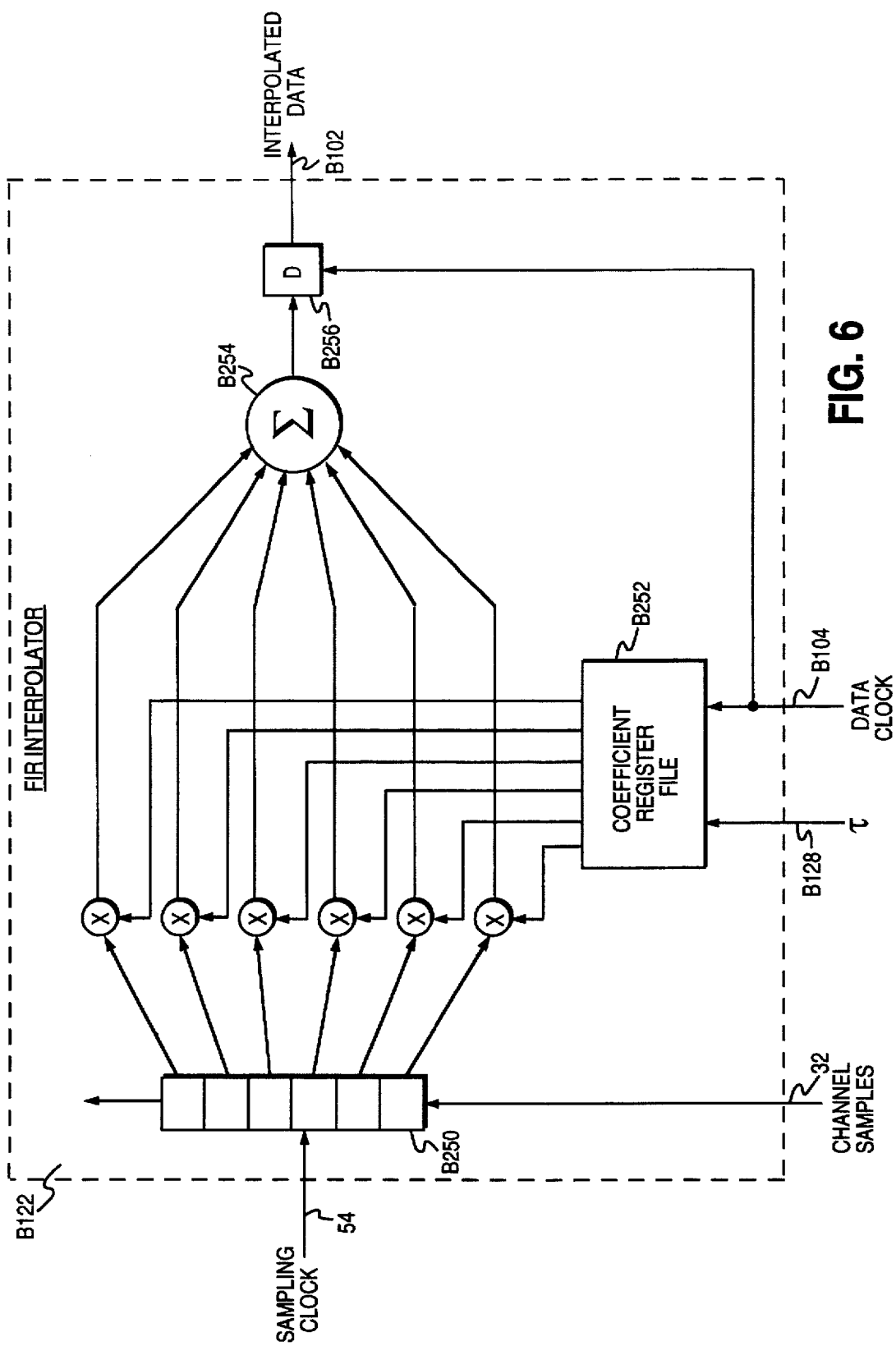
FIG. 6 shows an FIR filter implementation for the timing recovery interpolator.

Table B2 shows example coefficients $C_\tau(n)$ calculated from equation (15) with 2R=6, α=0.8 and $X(e^{j\omega})$=PR4. The implementation of the six tap FIR filter is shown in FIG. 6. A shift register B250 receives the channel samples 32 at the sampling clock rate 54. The filter coefficients $C_\tau(n)$ are stored in a coefficient register file B252 and applied to corresponding multipliers according to the current value of τ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of τ, filter the sample values in the shift register B250. Each filter outputs an interpolation value, and the current value of the interpolation interval τ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Cost Reduced Interpolator

Rather than store all of the coefficients of the interpolation filters in memory, in a more efficient, cost reduced implementation the coefficient register file B252 of FIG. 6 computes the filter coefficients $C_\tau(n)$ in real time as a function of τ. For example, the filter coefficients $C_\tau(n)$ can be computed in real time according to a predetermined polynomial in τ (see, for example, U.S. Pat. No. 4,866,647 issued to Farrow entitled, "A Continuously Variable Digital Delay Circuit," the disclosure of which is hereby incorporated by reference). An alternative, preferred embodiment for computing the filter coefficients in real time estimates the filter coefficients according to a reduced rank matrix representation of the coefficients.

The bank of filter coefficients stored in the coefficient register file B252 can be represented as an M×N matrix $A_{M\times N}$, where N is the depth of the interpolation filter (i.e., the number of coefficients $C_\tau(n)$ in the impulse response computed according to equation (15)) and M is the number of interpolation intervals (i.e., the number of τ intervals). Rather than store the entire $A_{M\times N}$ matrix in memory, a more efficient, cost reduced implementation is attained through factorization and singular value decomposition (SVD) of the $A_{M\times N}$ matrix.

Consider that the $A_{M\times N}$ matrix can be factored into an $F_{M\times N}$ and $G_{N\times N}$ matrix, $$A_{M\times N} = F_{M\times N} G_{N\times N}.$$

Then a reduced rank approximation of the $A_{M\times N}$ matrix can be formed by reducing the size of the $F_{M\times N}$ and $G_{N\times N}$ matrices by replacing N with L where L<N and, preferably, L<<N. Stated differently, find the $F_{M\times L}$ and $G_{L\times N}$ matrices whose product best approximates the $A_{M\times N}$ matrix, $$A_{M\times N} = F_{M\times L} G_{L\times N}.$$

Figure 7:
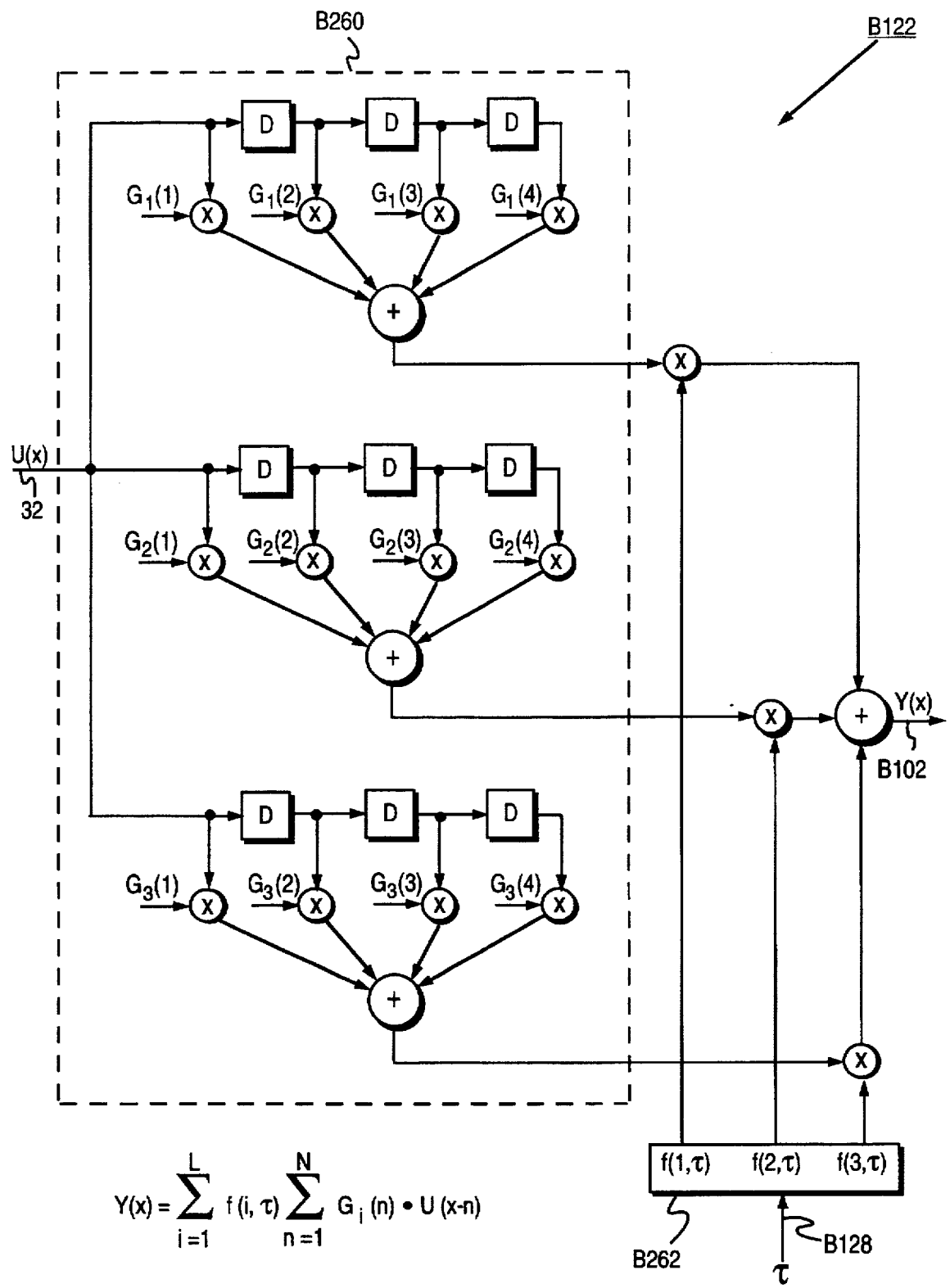
FIG. 7 depicts a alternative implementation for the timing recovery interpolator.

The convolution process of the interpolation filter can then be carried out, as shown in FIG. 7, by implementing the $G_{L\times N}$ matrix as a bank of FIR filters B260 connected to receive the channel sample values 32, and the $F_{M\times L}$ matrix implemented as a lookup table B262 indexed by τ B128 (as will become more apparent in the following discussion). Those skilled in the art will recognize that, in an alternative embodiment, the $A_{M\times N}$ matrix can be factored into more than two matrices (i.e., A≈FGH ...).

The preferred method for finding the $F_{M\times L}$ and $G_{L\times N}$ matrices is to minimize the following sum of squared errors:

$$\sum_{j=1}^{M} \sum_{n=1}^{N} (A_{jn} - (F_{M\times L} \cdot G_{L\times N})_{jn})^2 \quad (16)$$

The solution to equation (16) can be derived through a singular value decomposition of the $A_{M\times N}$ matrix, comprising the steps of:

1. performing an SVD on the $A_{M\times N}$ matrix which gives the following unique factorization (assuming M≥N):

$$A_{M\times N} = U_{M\times N} D_{N\times N} V_{N\times N}$$

where:

$U_{M \times N}$ is a M×N unitary matrix;
$D_{N \times N}$ is a N×N diagonal matrix $\{\sigma_1, \sigma_2, \ldots, \sigma_N\}$ where $\sigma_i$ are the singular values of $A_{M \times N}$, and $\sigma_1 \geq \sigma_2 \ldots \geq \sigma_N \geq 0$; and $V_{N \times N}$ is a N×N unitary matrix;

2. selecting a predetermined L number of the largest singular values a to generate a reduced size diagonal matrix $D_{L \times L}$:

$$D_{L \times L} = Diag\{\sigma_1, \sigma_2, \ldots, \sigma_L\} = \begin{bmatrix} \sigma_1 & 0 & \ldots & 0 \\ 0 & \sigma_2 & 0 \ldots & \vdots \\ \vdots & \ldots & . & 0 \\ 0 & \ldots & 0 & \sigma_L \end{bmatrix}$$

3. extracting the first L columns from the $U_{M \times N}$ matrix to form a reduced $U_{M \times L}$ matrix:

$$U_{M \times L} = \begin{bmatrix} \begin{bmatrix} U_{1,1} & \ldots & U_{1,L} \\ \vdots & \ldots & \ldots \\ \vdots & \ldots & \ldots \\ U_{M,1} & \ldots & U_{M,L} \end{bmatrix} & \ldots & \begin{matrix} U_{1,N} \\ \vdots \\ \vdots \\ U_{M,N} \end{matrix} \end{bmatrix}$$

4. extracting the first L rows from the $V_{N \times N}$ matrix to form a reduced $V_{L \times N}$ matrix:

$$V_{L \times N} = \begin{bmatrix} V_{1,1} & \ldots & V_{1,N} \\ . & & . \\ . & \ldots & . \\ . & & . \\ V_{L,1} & \ldots & V_{L,N} \\ . & & . \\ . & \ldots & . \\ . & & . \\ V_{N,1} & \ldots & V_{N,N} \end{bmatrix}$$

5. defining the $F_{M \times L}$ and $G_{L \times N}$ matrices such that:

$$F_{M \times L} \cdot G_{L \times N} = U_{M \times L} \cdot D_{L \times L} \cdot V_{L \times N} = A_{M \times N}$$

(for example, let $F_{M \times L} = U_{M \times L} \cdot D_{L \times L}$ and $G_{L \times N} = V_{L \times N}$).

In the above cost reduced polynomial and reduced rank matrix embodiments, the interpolation filter coefficients $C_\tau(n)$ are computed in real time as a function of $\tau$; that is, the filter's impulse response $h(n)$ is approximated according to:

$$h(n, \tau) = c_\tau(n) = \sum_{i=1}^{L} G_i(n) \cdot f(i, \tau) \quad (17)$$

where $f(i, \tau)$ is a predetermined function in $\tau$ (e.g., polynomial in $\tau$ or $\tau$ indexes the above $F_{M \times L}$ matrix); L is a degree which determines the accuracy of the approximation (e.g., the order of the polynomial or the column size of the above $F_{M \times L}$ matrix); and $G_i(n)$ is a predetermined matrix (e.g., the coefficients of the polynomial or the above $G_{L \times N}$ matrix). As L increases, the approximated filter coefficients $C_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x-n) \sum_{i=1}^{L} G_i(n) \cdot f(i, \tau) \quad (18)$$

where U(x) are the channel sample values 32 and N is the number of interpolation filter coefficients $C_\tau(n)$.

Referring again to FIG. 6, the coefficient register file can compute the interpolation filter coefficients $C_\tau(n)$ according to equation (17) and then convolve the coefficients $C_\tau(n)$ with the channel samples U(x) 32 to generate the interpolated sample values B102 synchronized to the baud rate. However, a more efficient implementation of the interpolation filter can be realized by rearranging equation (18):

$$Y(x) = \sum_{i=1}^{L} f(i, \tau) \sum_{n=1}^{N} G_i(n) \cdot U(x-n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x-n)$$

is implemented as a bank of FIR filters B260 as shown in FIG. 7. Again, in equation (19) L is the depth of the approximation function $f(i, \tau)$ (e.g., the order of the polynomial or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may increase as IC technology progresses and the cost per gate decreases.

d=0 Remod/Demod Detector

In sampled amplitude storage systems that employ a d=0 RLL constraint, the read channel is normally equalized to a PR4 response and the discrete time sequence detector implemented as a pair of interleaved sliding threshold Viterbi detectors. PR4 equalization is preferred because higher order d=0 sequence detectors (such as EPR4 and EEPR4) become more complex and expensive to implement due to the increased number of states in the trellis model. It is possible, however, to augment a conventional PR4 sequence detector by searching for minimum distance error events in the EPR4 domain, and then correcting the output of the PR4 detector when an error event is detected. In this manner, the performance of the sequence detector approaches that of an EPR4 detector with lower complexity and cost than d=0 EPR4.

Figure 8A:
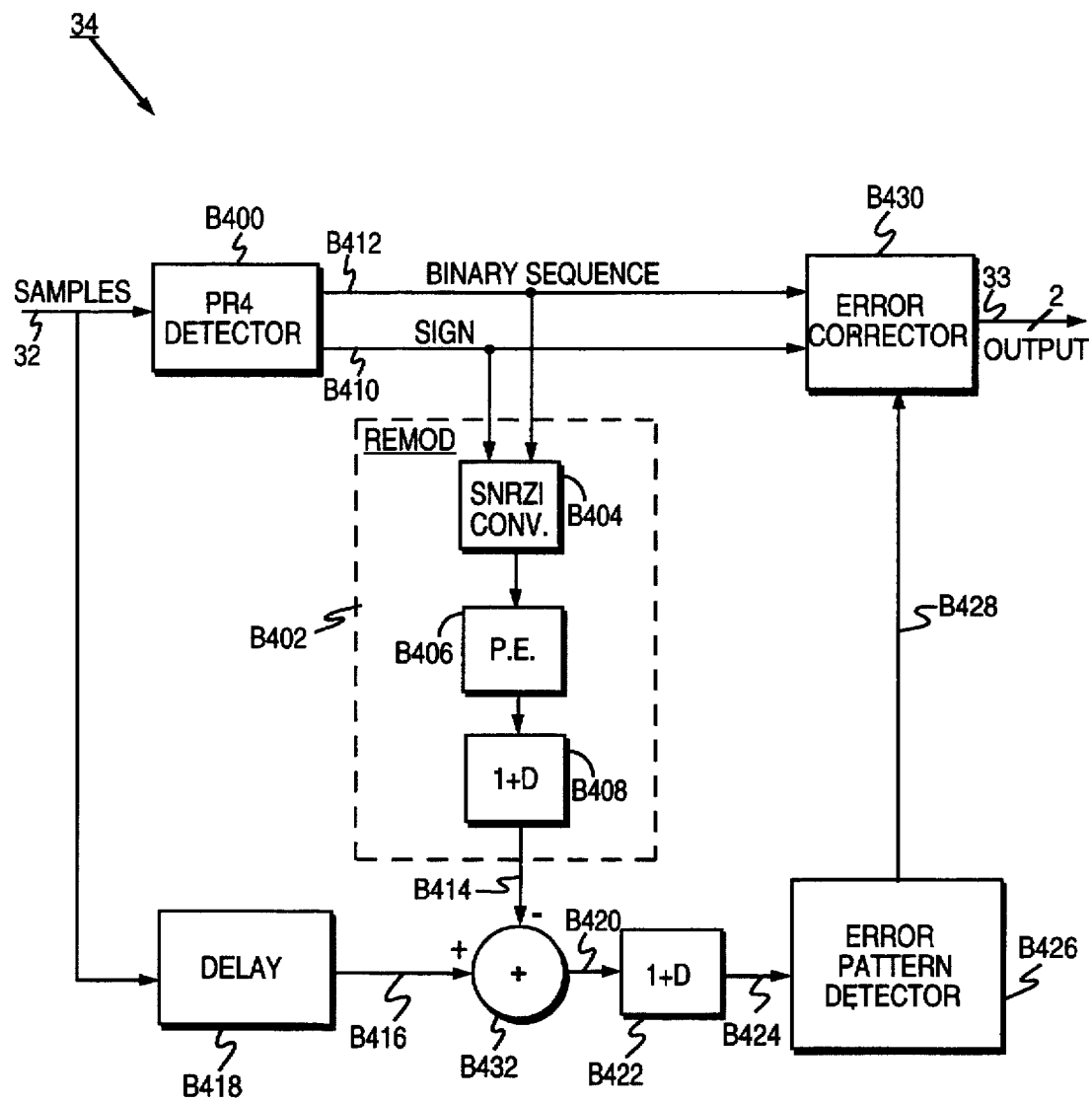
FIG. 8A an overview of a modified PR4 sequence detector (remod/demod detector) for use in a d=0 read channel of the present invention.

The preferred embodiment of the modified PR4 detector for use in a d=0 read channel is shown in FIG. 8A. It operates according to the following steps:

1. remodulate the output of a conventional PR4 sequence detector into a sequence of ideal PR4 sample values;
2. subtract the ideal PR4 sample values from the read signal sample values to generate a sequence of PR4 sample error values;
3. convert the PR4 sample error values into EPR4 sample error values;
4. filter the EPR4 sample error values with a bank of filters matched to the dominant EPR4 error events; and
5. select the matched filter output with the highest magnitude, and if greater than a predetermined threshold, correct the PR4 detected binary sequence accordingly if the correction is valid (i.e., results in a valid PR4 sequence).

Because the modified PR4 detector of FIG. 8A remodulates the detected binary sequence into an estimated PR4 sample sequence and then demodulates the read signal by correcting errors detected in the EPR4 domain, the detector is referred to as a remod/demod detector.

Referring now to FIG. 8A in detail, a conventional PR4 sequence detector B400 detects a preliminary binary sequence B412 from the read signal sample values 32. The PR4 detector B400 is preferably implemented as a pair of interleaved sliding threshold Viterbi detectors, except that the sign B410 of the transitions in both interleaves is saved and used by a remodulator B402. A sign bit B410 is associated with each "1" and "0" bit output by the PR4 detector B400 in each interleave. For example, if a positive transition is detected in the even interleave, then the PR4 detector B400 outputs a "+1" followed by "+0" values until a negative transition is detected. The sign bit B410, together with the detected binary sequence B412, is used to remodulate to an ideal PR4 sample sequence B414.

The remodulator comprises a signed PR4-to-SNRZI converter B404 (SNRZI is short for signed NRZI), a partial erasure compensator B406, and a 1+D filter B408, the details of which are discussed below. The remodulated sample sequence B414 is subtracted from the actual read signal samples B416 to generate a PR4 sample error sequence B420. (A delay B418 delays the read signal samples to account for the delay of the PR4 sequence detector B400 and remodulator B402.) The PR4 sample error sequence B420 is then passed through a 1+D filter B422 to generate an EPR4 sample error sequence B424.

An error pattern detector B426 matched to the dominant EPR4 error events processes the EPR4 sample error sequence B424, and if an EPR4 error event is detected, a corresponding correction signal B428 is applied to an error corrector circuit B430 which corrects the erroneous bits in the detected binary sequence B412 output by the PR4 sequence detector B400.

Figure 8B:
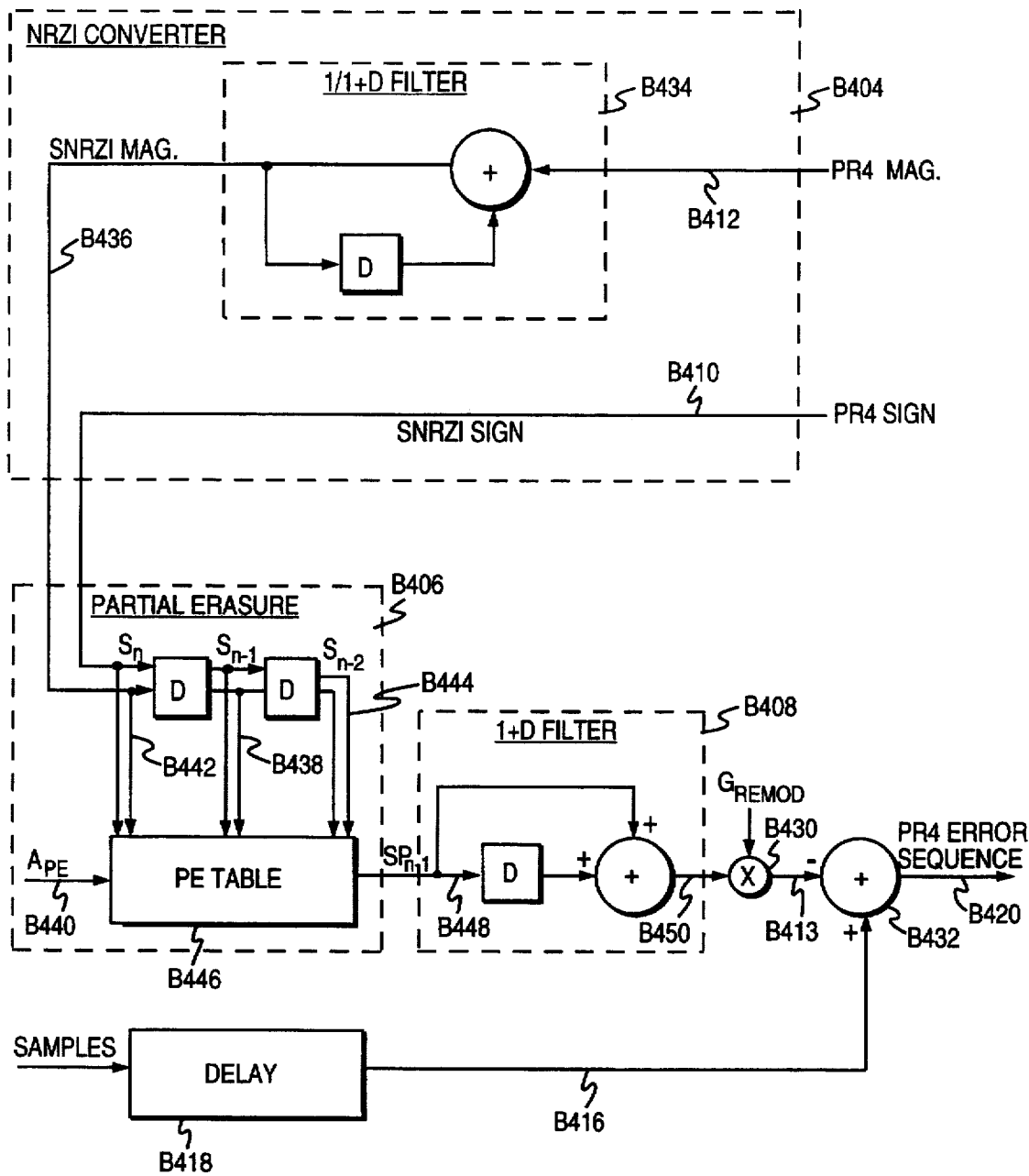
FIG. 8B shows details of the remodulator for the remod/ demod sequence detector of FIG. 8A.

Details of the remodulator circuit B402 are shown in FIG. 8B and include a SNRZI converter B404, a partial erasure compensator B406, a 1+D filter B408, a gain B430, and an adder B432. The SNRZI converter B404 receives the detected binary bits B412 (i.e., 0 or 1) and associated sign bits (i.e., ±1 or ±0) B410 from the PR4 sequence detector B400. A 1/1+D filter B434 filters the detected binary sequence B412 to generate a sequence of corresponding SNRZI magnitude samples B436, and the sign bits B410 of the detected binary sequence B412 convert directly to SNRZI sign bits.

Alternatively, the SNRZI converter B404 can be implemented as a lookup table indexed by the detected binary sequence B432 and associated sign bits B410. The lookup table implementation avoids error propagation in the event of a quasi catastrophic error event (i.e., an error which results in unmerged paths in the PR4 sequence detector B400). The entries for the lookup table are shown in Table B3.

After converting the detected binary sequence to a SNRZI sequence (designated $S_n$), a partial erasure compensator B406 adjusts the magnitude of the SNRZI samples to account for the non-linear reduction in pulse amplitude caused by adjacent flux transitions. That is, the magnitude of the SNRZI sample at $S_{n-1}$ B438 is reduced to $\pm A_{PE}$ B440 (where $|\pm A_{PE}|<1$) if there is an adjacent transition either at $S_n$ B442 or at $S_{n-2}$ B444, and the magnitude of $S_{n-1}$ B438 is reduced to $\pm(A_{PE}A_{PE})$ if there is an adjacent transition both at $S_n$ B442 and at $S_{n-2}$ B444. To implement the partial erasure compensator B406, the SNRZI samples, designated $S_n$, $S_{n-1}$ and $S_{n-2}$, index a lookup table B446 which outputs a modified value for $S_{n-1}$ (designated $SP_{n-1}$ B448) in accordance with the entries shown in Table B4.

After compensating for the effect of partial erasure, the modified SNRZI samples $SP_{n-1}$ B448 pass through a 1+D filter B408, thereby converting the SNRZI samples into an estimated PR4 sample sequence B450. Because the AGC 50 loop attempts to compensate for the non-linear effect of partial erasure by adjusting the read signal amplitude toward an ideal PR4 magnitude on average, a gain multiplier B430 adjusts the magnitude of the remodulated PR4 sequence B450 to compensate for the adjustment made by the AGC 50. The estimated PR4 sample sequence B413 at the output of the gain multiplier B430 is then subtracted from the actual read signal sample values B416 at adder B432 to generate a PR4 sample error sequence B420.

Figure 8C:
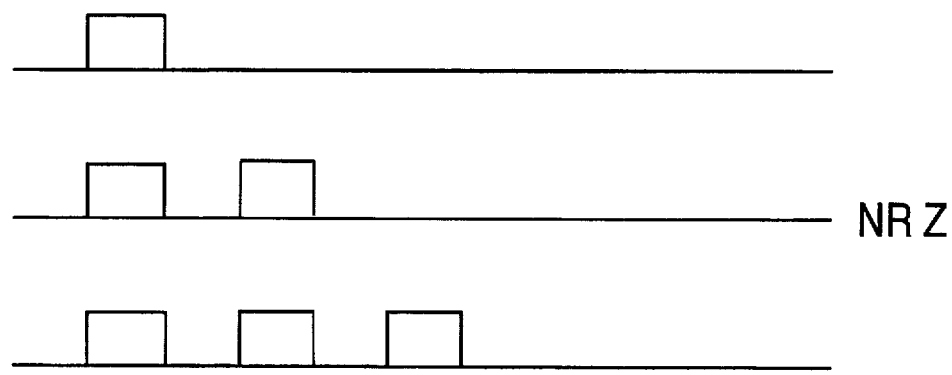
FIG. 8C–8E show three dominant error events in sampled amplitude read channels in the NRZ, PR4 and EPR4 domain.
Figure 8D:
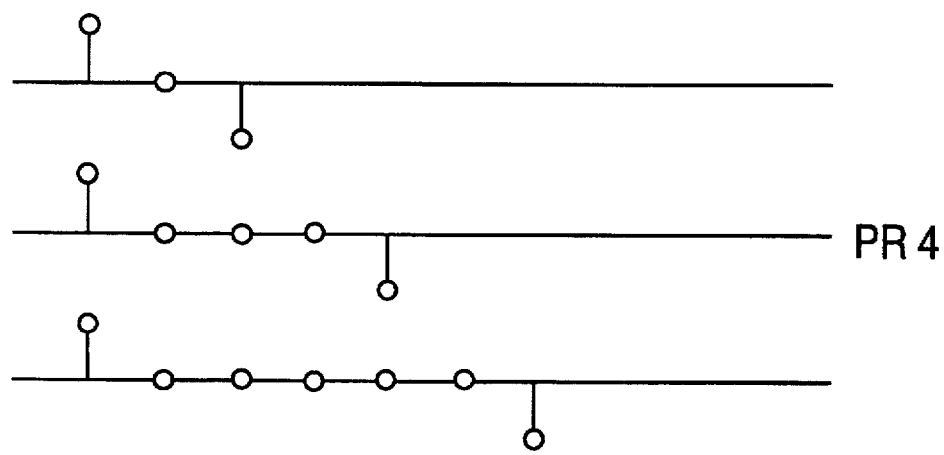
Figure 8E:
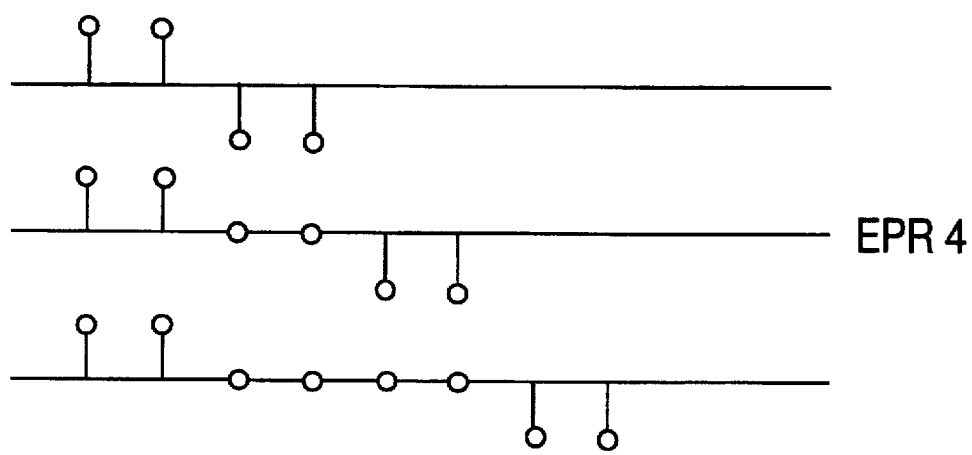

Referring again to FIG. 8A, the PR4 sample error sequence B420 passes through a 1+D filter B422 to generate an EPR4 sample error sequence B424. The EPR4 sample error sequence B424 is then processed by an error pattern detector B426 matched to minimum distance EPR4 error events, examples of which are shown in FIGS. 8C–8E. FIG. 8C shows three minimum distance error events for an PR4 error detector in the NRZ domain, FIG. 8D shows the same error events in the PR4 domain, and FIG. 8E shows the error events in the EPR4 domain. Notice that the EPR4 error sequences of FIG. 8E can be generated by passing the corresponding PR4 error sequences of FIG. 8D through a 1+D filter. Thus, the error pattern detector B426 can be implemented as a 1+D filter followed by a bank of filters matched to PR4 error sequences. To further simplify the circuit, the 1+D filter B422 of FIG. 8A for converting to an EPR4 sample error sequence can be combined with the 1+D filter in the error pattern detector B426 to form a $1+2D+D^2$ filter B450 as shown in FIG. 8F.

Figure 8F:
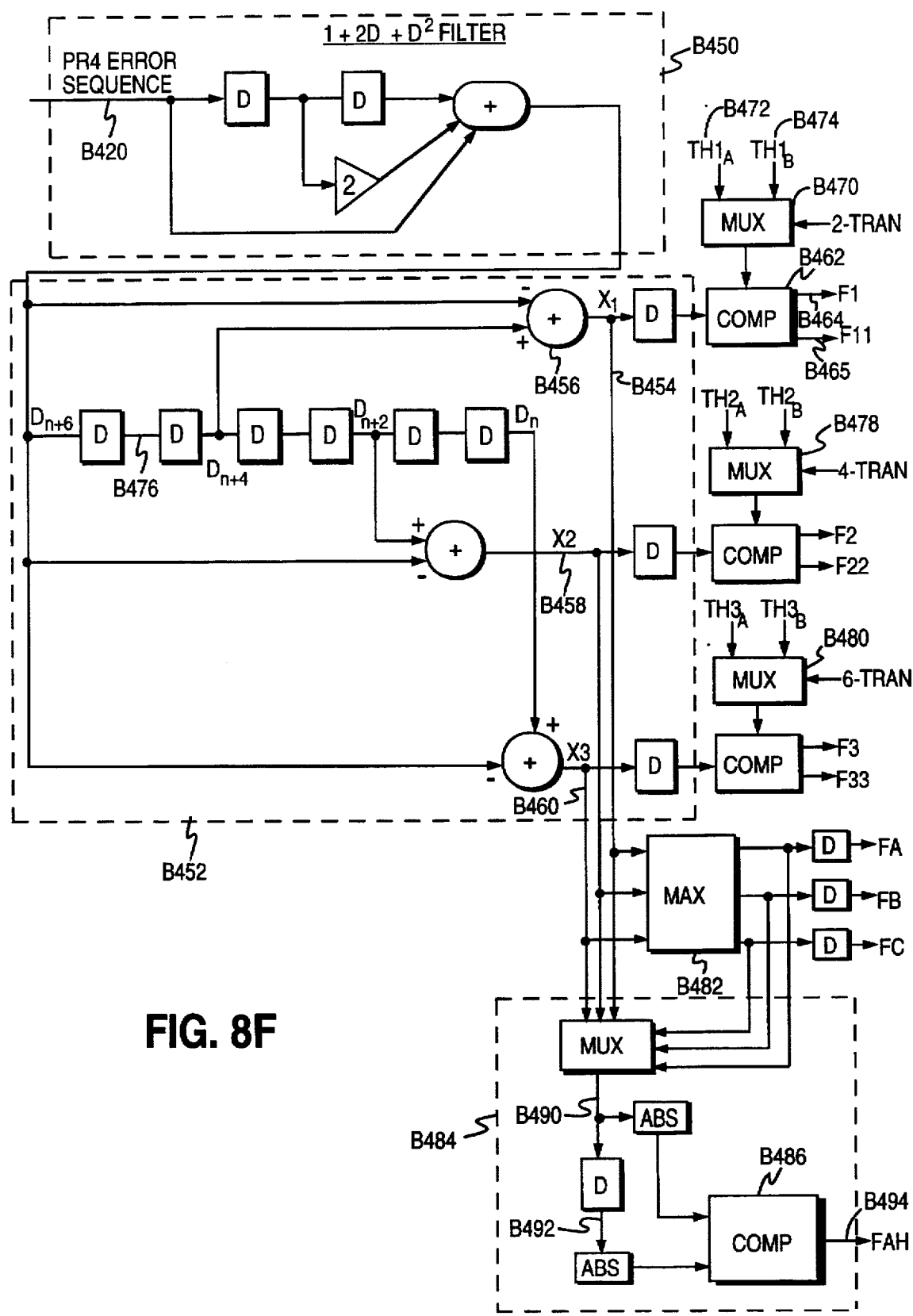
FIG. 8F shows details of an error pattern detector comprising a bank of filters Matched to the dominant error events of FIG. 8C–8E.

The output of the $1+2D+D^2$ filter B450 in FIG. 8F is connected to a bank of filters B452 each having an impulse response matched to a corresponding PR4 error sequences shown in FIG. 8D. The output X1 B454 of adder B456 corresponds to the first error sequence in FIG. 8D, the output X2 B458 corresponds to the second error sequence of FIG. 8D, and the output X3 B460 corresponds to the third error sequence in FIG. 8D. The matched filter outputs are compared to a predetermined threshold and an error detect signal is asserted if the threshold is exceeded. For example, a comparator B462 compares the X1 output B454 to a threshold ($TH1_A$ or $TH1_B$) and if X1 B454 exceeds the threshold the F1 signal B464 is asserted. Additionally, the comparator B462 outputs a sign bit F11 B465 indicating the polarity of the detected error (i.e., the polarity of the errors shown in FIGS. 8C–8E may be reversed).

If an error event associated with a dibit, quad-bit or 6-bit transition sequence could occur, then the threshold level compared to the output of the corresponding matched filter is reduced to compensate for the effect of partial erasure. (Again, partial erasure is a reduction in pulse amplitude caused by adjacent pulse(s).) For instance, a multiplexer B470 selects the $TH1_A$ threshold B472 to compare to X1 B454 if a dibit sequence is detected, mis-detected, or falsely detected at $D_{n+5}$ B476 (that is, if the NRZI bits at times $D_{n+5}$ and $D_{n+4}$ are both non-zero or both zero); otherwise, the multiplexer B470 selects the $TH1_B$ threshold to compare to X1 B454. Similarly, multiplexer B478 selects a $TH2_A$ threshold to compare to X2 B458 if a quad-bit sequence is detected, mis-detected, or falsely detected at $D_{n+5}$ B476 (that is, if the NRZI bits at times $D_{n+5}$, $D_{n+4}$, $D_{n+3}$ and $D_{n+2}$ are non-zero or zero); otherwise, the multiplexer B478 selects the $TH2_B$ threshold to compare to X2 B458. Finally, multiplexer B480 selects a $TH3_A$ threshold to compare to X3 B460 if a 6-bit transition sequence is detected, mis-detected, or falsely detected at $D_{n+5}$ B476 (that is, if the NRZI bits at times $D_{n+5}$, $D_{n+4}$, $D_{n+3}$, $D_{+2}$, $D_{n+1}$ and $D_n$ are non-zero or zero); otherwise, the multiplexer B480 selects the $TH3_B$ threshold to compare to X3 B460. The $THX_A$ thresholds are computed as the $THX_B$ thresholds multiplied by the partial erasure reduction factor $A_{PE}$ B440 of FIG. 8B. Also, the circuit can be simplified by setting $TH1_A=TH2_A=TH3_A$ and $TH1_B=TH2_B=TH3_B$.

A MAX circuit B482 compares the matched filter outputs X1, X2 and X3 and asserts a signal FA, FB or FC which corresponds to the matched filter output with the highest absolute amplitude. The signals FA, FB and FC are used to correct the detected binary sequence, as described below.

A peak error detector circuit B484, responsive to the matched filter outputs X1, X2 and X3 and the maximum absolute amplitude signals FA, FB and FC, compares B486 the maximum matched filter output at time n B490 to the maximum matched filter output at time n−1 B492. If the maximum filter output at time n is less than at time n−1, then signal FAH B494 is asserted indicating that a peak error signal has been detected. The FAH B494 signal enables operation of the error corrector circuit B430 of FIG. 8A.

In an alternative embodiment not shown, signals FA, FB, FC and FAH of FIG. 8F are generated using the difference between the filter outputs and the comparator thresholds, rather than the output of the filters. That is, the MAX circuit B482 compares three values computed as the difference between the filter outputs $X_k$ and corresponding threshold $TH_k$, and the peak error detector B484 looks for a peak in these difference values. This embodiment may be preferred if different threshold values are used for each error event.

Figure 8G:
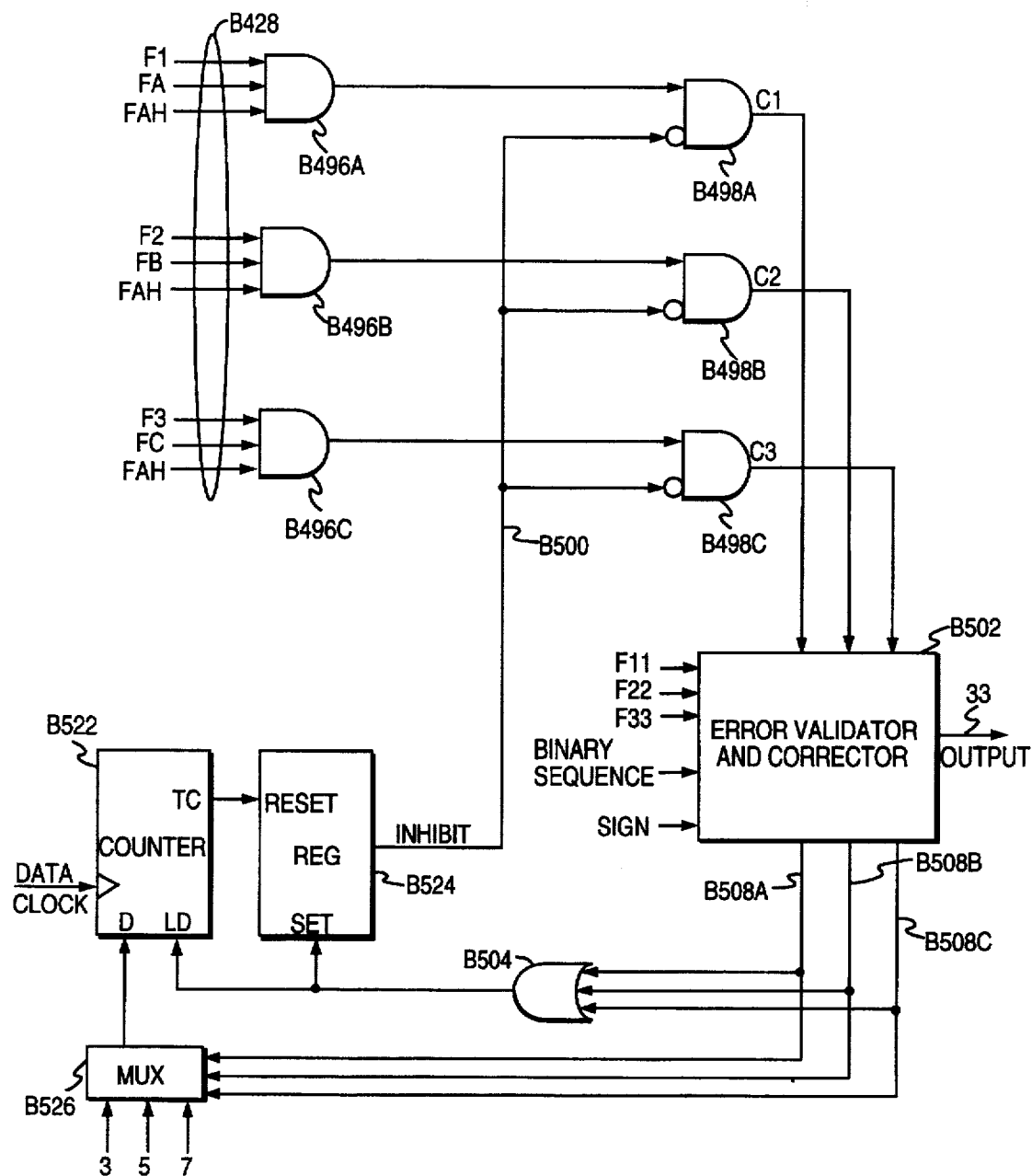
FIG. 8G is a circuit for correcting errors in the detected binary sequence output by the PR4 Viterbi detector when the error pattern detector of FIG. 8F detects an error.
Figure 8H:
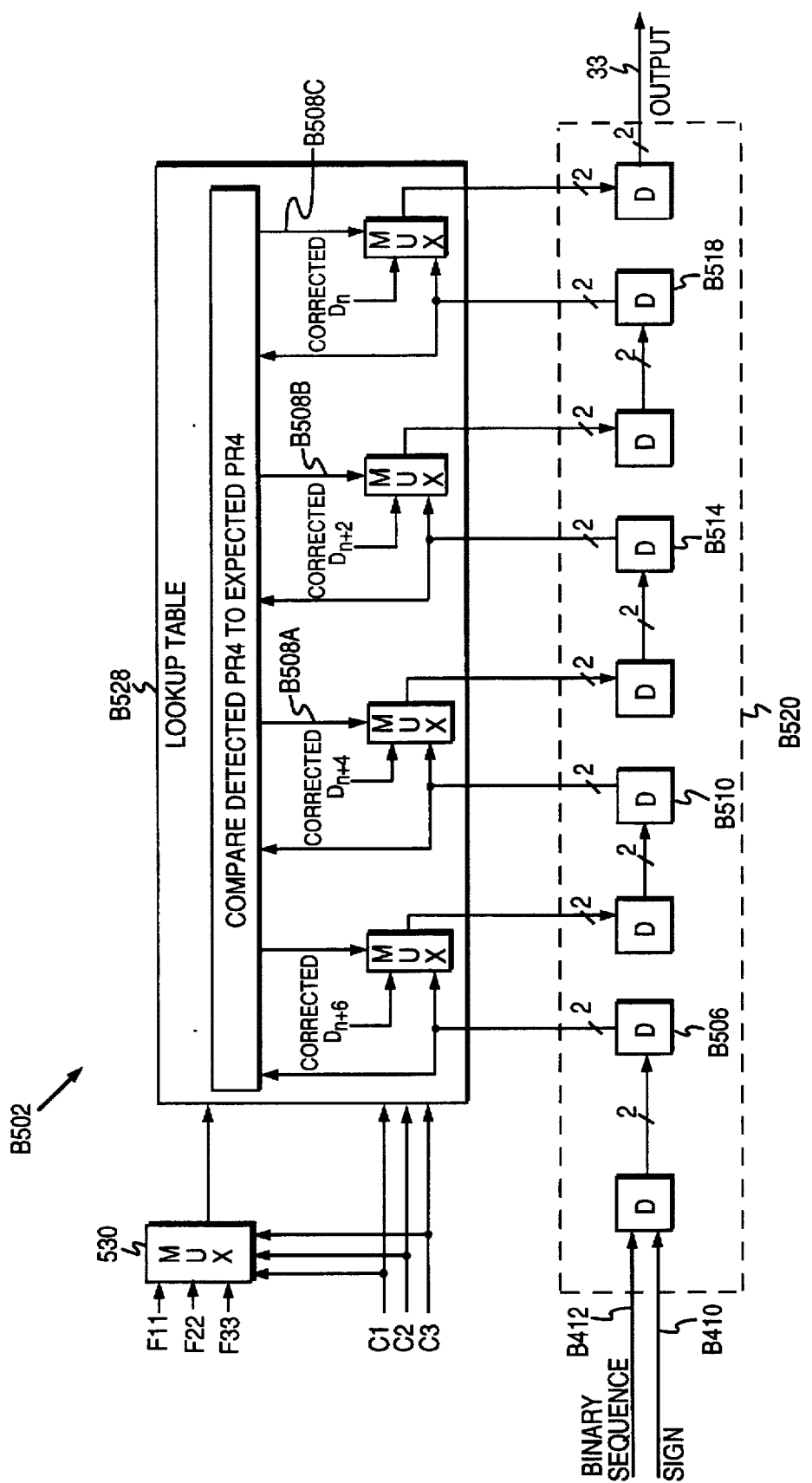
FIG. 8H shows a circuit for checking the validity of a detected error pattern.

Details of the error corrector circuit B430 of FIG. 8A are shown in FIG. 8G and 8H. In FIG. 8G, the F1–F3, FA–FC and FAH signals B428 from the error pattern detector B426 are input into respective error event AND gates B496A–B496C, the outputs of which are enabled through AND gates B498A–B498C by an INHIBIT signal B500. An error event is detected (C1, C2 or C3) if the corresponding matched filter output exceeds the TH threshold (F1, F2, or F3) AND it is the largest error event (FA, FB or FC) AND it is a peak error event (FAH B494 is asserted) AND the INHIBIT signal B500 is not asserted. The detected error events (C1, C2 and C3), error event signs (F11, F22 and F33), detected binary sequence B412 and sign bit B410 are input into an error validator and corrector B502 which corrects the detected binary sequence B412 (and sign bit B410) if the detected error event is valid.

The INHIBIT signal B500 operates as follows: if a valid error event is detected, assert the INHIBIT signal B500 for a number of clock cycles equal to the length of the detected error event; that is, do not process subsequent error events until the current error event has been corrected.

The INHIBIT signal B500 is implemented with a counter B522, a register B524, a multiplexer B526, and an OR gate B504. If a valid error event is detected (B508A, B508B or B508C is asserted), then the output of OR gate B504 sets the output of the register B524 (i.e., the INHIBIT signal B500) high, thereby disabling AND gates B498A–B498C. The detected error event selects a count value, 3, 5, or 7, respectively, through multiplexer B526, and the output of OR gate B504 loads the count value into the counter B522. The DATA CLOCK then clocks the counter B522 and when it reaches terminal count, a TC signal B528 resets the register B524, thereby re-enabling the AND gates B498A–B498C.

The outputs of AND gates B498A–B498C, designated C1, C2 and C3, correspond to the three error events that can be detected by the matched filters in the error pattern detector B426. These signals are used to correct the detected binary sequence B412 (and sign bit B410) as it shifts through a series of registers B520 shown in FIG. 8H. However, before correcting the binary sequence according to a detected error event, the validity of the correction itself is checked.

An error event can be falsely detected if, for example, the noise which causes the detected error has the same polarity as the read signal. To clarify, consider the first error event shown in FIG. 8D. Assuming that this PR4 signal was noise detected erroneously as a dibit data sequence, then the correction would be to add the sequence (−1,−0,+1) to the detected PR4 sequence (+1,+0,−1) in order to cancel the noise. If, however, a dibit data sequence was actually recorded at the same location as the added noise, then an error event of opposite polarity would be detected and the correction would be to add the sequence (+1,+0,−1) to the detected sequence (+,+0,−1), thereby resulting in a corrected sequence of (+2,+0,−2). In this case, the PR4 sequence detector B400 would make the correct decision, and the detected binary sequence B412 should not be corrected.

Referring again to FIG. 8H, circuitry is provided to check the validity of a detected error event before making a correction to the detected data sequence. A lookup table B528 evaluates the detected error event relative to the detected PR4 sequence. A correction is made to the detected binary sequence B412 (and sign bit B410) output by the PR4 sequence detector B400 only if the correction results in a valid PR4 sequence. That is, for each error event, the detected PR4 sequence must match a possible expected PR4 sequence or a correction is not made.

In operation, the lookup table B528 receives the detected error event (C1, C2, or C3), the sign of the error event (F11, F22, or F33 as selected by the detected error event via multiplexer B530), and the corresponding detected PR4 data (detected binary sequence B412 and sign bit B410) at $D_{n+6}$ B506, $D_{n+4}$ B510, $D_{n+2}$ B514 and $D_n$ B518. If a C1 error event is detected, then using Table B5 below the lookup table B528 compares the detected PR4 sequence to the expected PR4 sequence at $D_{n+6}$ B506 and $D_{n+4}$ B510. If there is a match, then the corrected PR4 data at $D_{n+6}$ and $D_{n+4}$ is inserted into the shift register B520; otherwise, the detected PR4 sequence is restored to the shift register B520 uncorrected. Similarly, if a C2 error event is detected, then using Table B6 below the lookup table B528 compares the detected PR4 sequence to the expected PR4 sequence at $D_{n+6}$ B506, $D_{n+4}$ B510 and $D_{n+2}$ B514. If there is a match, then the corrected PR4 data at $D_{n+6}$, $D_{n+4}$ and $D_{n+2}$ is inserted into the shift register B520; otherwise, the detected PR4 sequence is restored to the shift register B520 uncorrected. Finally, if a C3 error event is detected, then using Table B7 below the lookup table B528 compares the detected PR4 sequence to the expected PR4 sequence at $D_{n+6}$ B506, $D_{n+4}$ B510, $D_{n+2}$ B514 and $D_n$ B518. If there is a match, then the correct PR4 data at $D_{+6}$, $D_{+4}$, $D_{n+2}$ and $D_n$ is inserted into the shift register B520; otherwise, the detected PR4 sequence is restored to the shift register B520 uncorrected. The corrected binary sequence B412 (and sign bit B410) is then shifted out of the shift register B520 for further processing by the read channel.

Sub-sampled Read Channel

In the discussion above, the interpolated timing recovery of FIG. 4B was described as an over-sampled system; that is, the analog read signal 62 is slightly over-sampled 24 and then "down-sampled" (interpolated B122) to generate sample values B102 synchronized to the baud rate. It is possible, however, to significantly under-sample the analog read signal and then "up-sample" to generate the synchronous samples. This is accomplished by sampling 24 at a rate significantly lower than the baud rate (e.g., ⅔ the baud rate) and then interpolating B122 to the baud rate sample values using the interpolated timing recovery circuit of FIG. 4B. Sub-sampling and interpolation alleviates the speed constraint of the A/D and obviates the timing recovery VCO B164 of FIG. 4A, thereby increasing the overall throughput of the read channel.

Figure 9A:
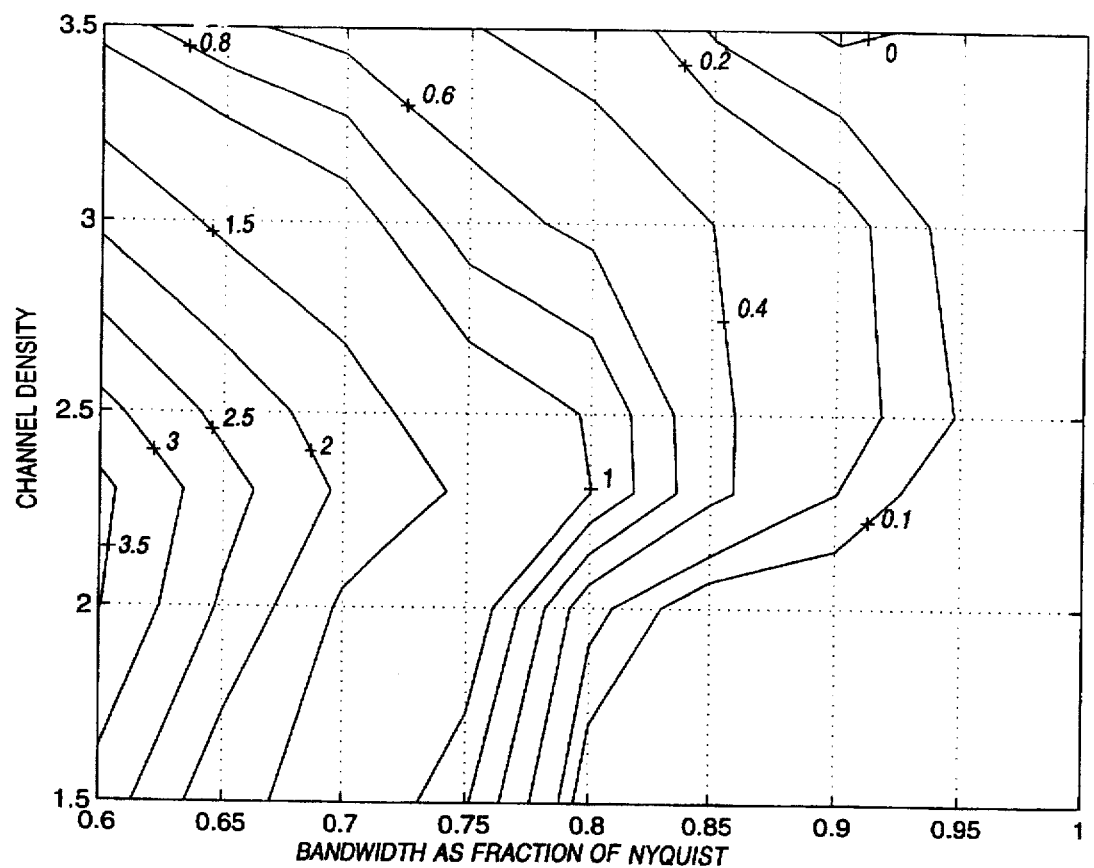
FIG. 9A is a contour plot of the minimum distance loss as a function of the degree of sub-sampling and channel desities employed in a d=0 read channel.

Computer simulations were carried out to determine the extent that sub-sampling degrades the performance of the read channel, that is, to find a threshold where the loss in performance outweighs the gain in user data rate derived from sub-sampling the read signal. First, the sub-sampled read channel was simulated without any code constraint (d=0), the results of which are shown in FIG. 9A. This graph is a contour plot of the distance loss in dB (performance loss) caused by sub-sampling (decrease in bandwidth as a fraction of the baud rate) for various channel densities (number of channel bits per linear track inch). As shown in FIG. 9A, a read channel operating at a sub-sampled rate without a code constraint (d=0) quickly loses performance at higher data densities as the amount of sub-sampling increases.

Figure 9B:
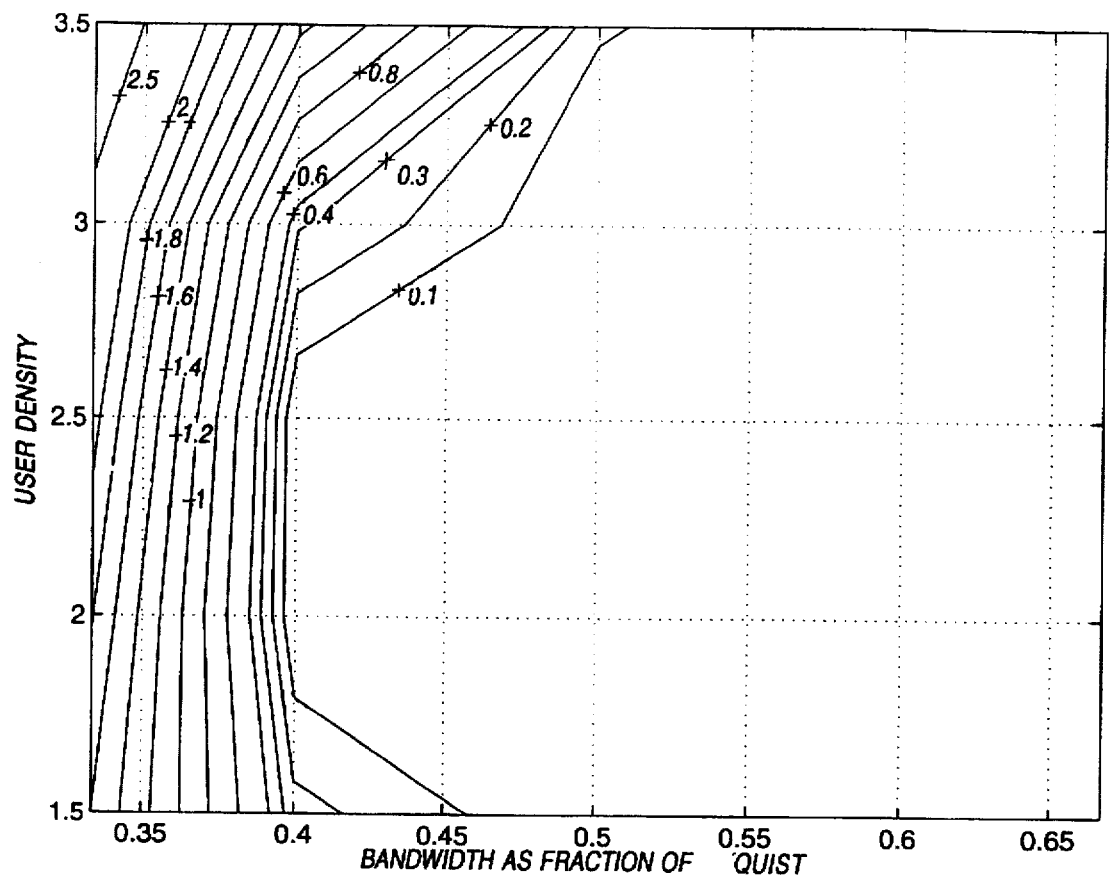
FIG. 9B is a contour plot of the minimum distance loss as a function of the degree of sub-sampling and user densities employed in a d=1 read channel.

The same computer simulations were then carried out after introducing a code constraint which increases the minimum distance error event for a maximum likelihood sequence detector. In particular, a RLL d=1 constraint was introduced, the results of which are shown in FIG. 9B. As illustrated by FIG. 9B, the code constraint significantly improves performance of the read channel, even at higher user densities. In fact, there is virtually no performance loss for sub-sampling up to one half the baud rate and user densities up to 3.5. Those skilled in the art will recognize that similar code constraints, other than d=1, may also improve performance in the presence of sub-sampling.

For both the uncoded (d=0) and d=1 code constraint, the simulations were carried out for an optimal MLSD sequence detector which comprises: a filter matched to the pulse shape p(t), a sampler producing $x_k=x(kT)$, a noise whitening filter, and a Viterbi (or equivalent) detection algorithm. Thus, the simulation results of FIG. 9A and 9B are a theoretical bound on the best possible performance for varying degrees of sub-sampling. Practical sequence detection methods are approximations of the optimal MLSD, and they should degrade similarly as the degree of sub-sampling increases (bandwidth decreases).

Conventional d=1 Sub-sampled Read Channel

Referring again to FIG. 9B, there is virtually no loss in performance for an optimal MLSD read channel when employing a d=1 code constraint and sub-sampling up to approximately one half the baud rate. This is very encouraging since it indicates that a more practical read channel will also operate at similar sub-sampled rates without any significant loss in performance. Computer simulations of a conventional d=1, rate ⅔, read channel using sub-sampling at ⅔ the baud rate and the above-described interpolated timing recovery verified that this is the case.

Figure 10:
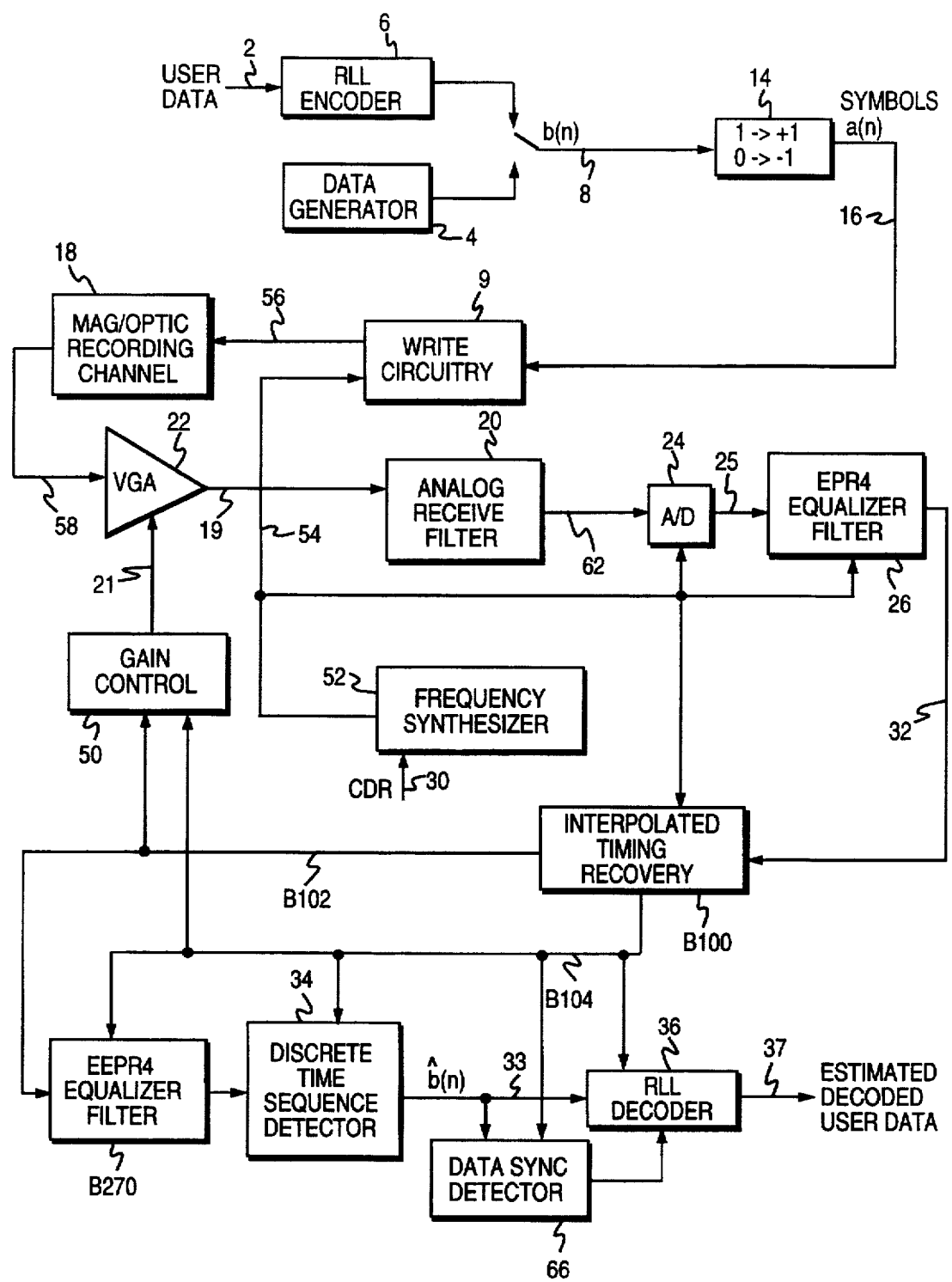
FIG. 10 shows a preferred embodiment of the present invention for a d=1 sub-sampled read channel.
Figure 11:
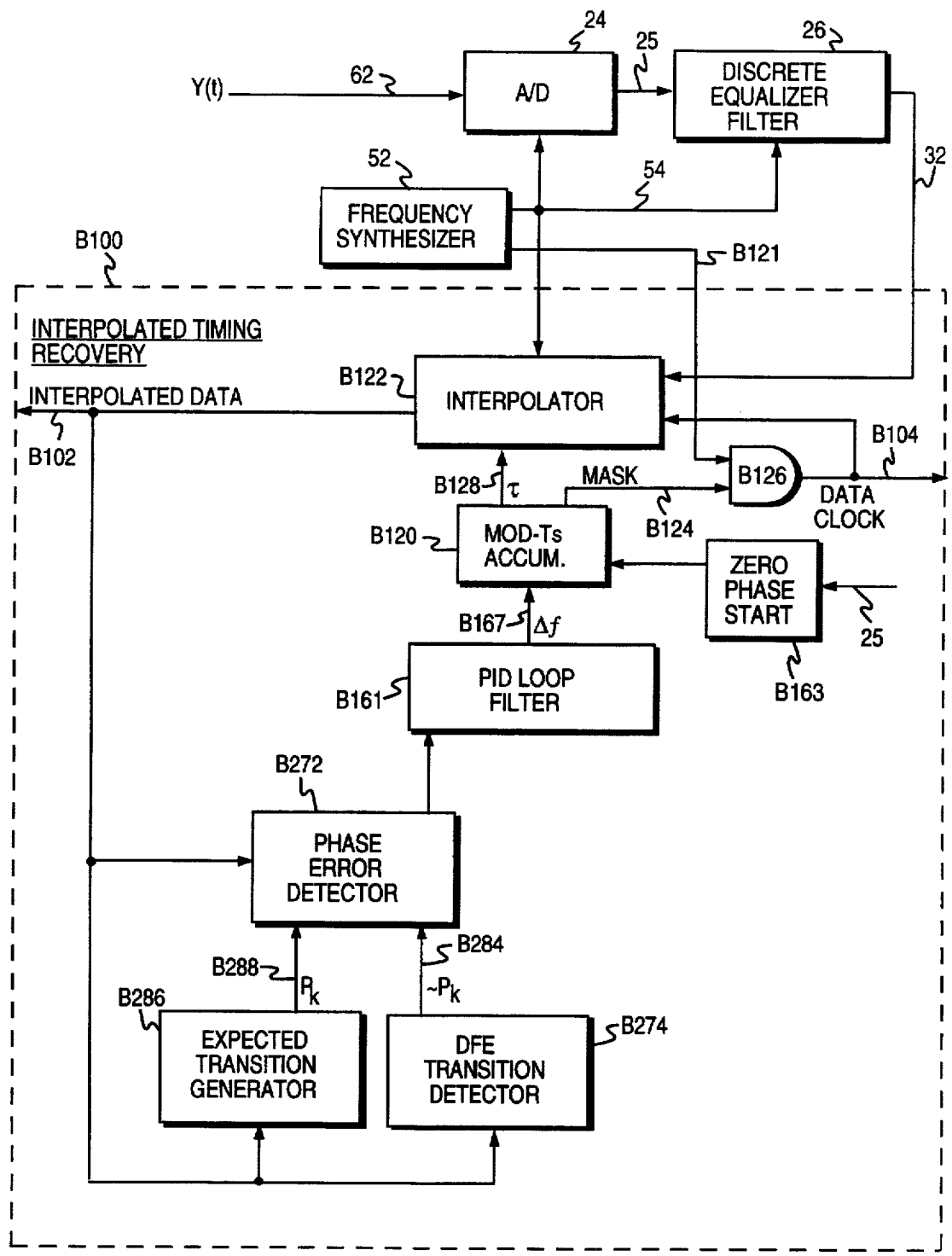
FIG. 11 is a block diagram of the interpolated timing recovery for a d=1 sub-sampled read channel of the present invention.

The preferred embodiment of the present invention for a d=1 sub-sampled read channel is shown in FIG. 10, which is similar in form and function as the read channel shown in FIG. 3. Also, the cutoff frequency of the analog receive filter 20 is decreased to attenuate the increased aliasing noise caused by sub-sampling the read signal. In the interpolated timing recovery B100, the slicer of FIG. 4B is replaced with a DFE transition detector B274 as shown in FIG. 11. Additionally, a first equalizer 26 provides EPR4 equalization optimized for the timing recovery transition detector B274, and a second equalizer B270 provides EEPR4 equalization optimized for the d=1 sequence detector 34.

Referring now to FIG. 11, the phase error detector B272 computes a phase error estimate as a function of the interpolated sample values B102 and either expected transitions $P_k$ B288 during acquisition or detected transitions $-P_k$ B284 during tracking. The expected transition generator B286 of FIG. 11 operates similar to that of FIG. 4B; that is, it uses a state machine to generate expected transitions $P_k$ B288 for computing the phase error estimate while acquiring the acquisition preamble.

Figure 12:
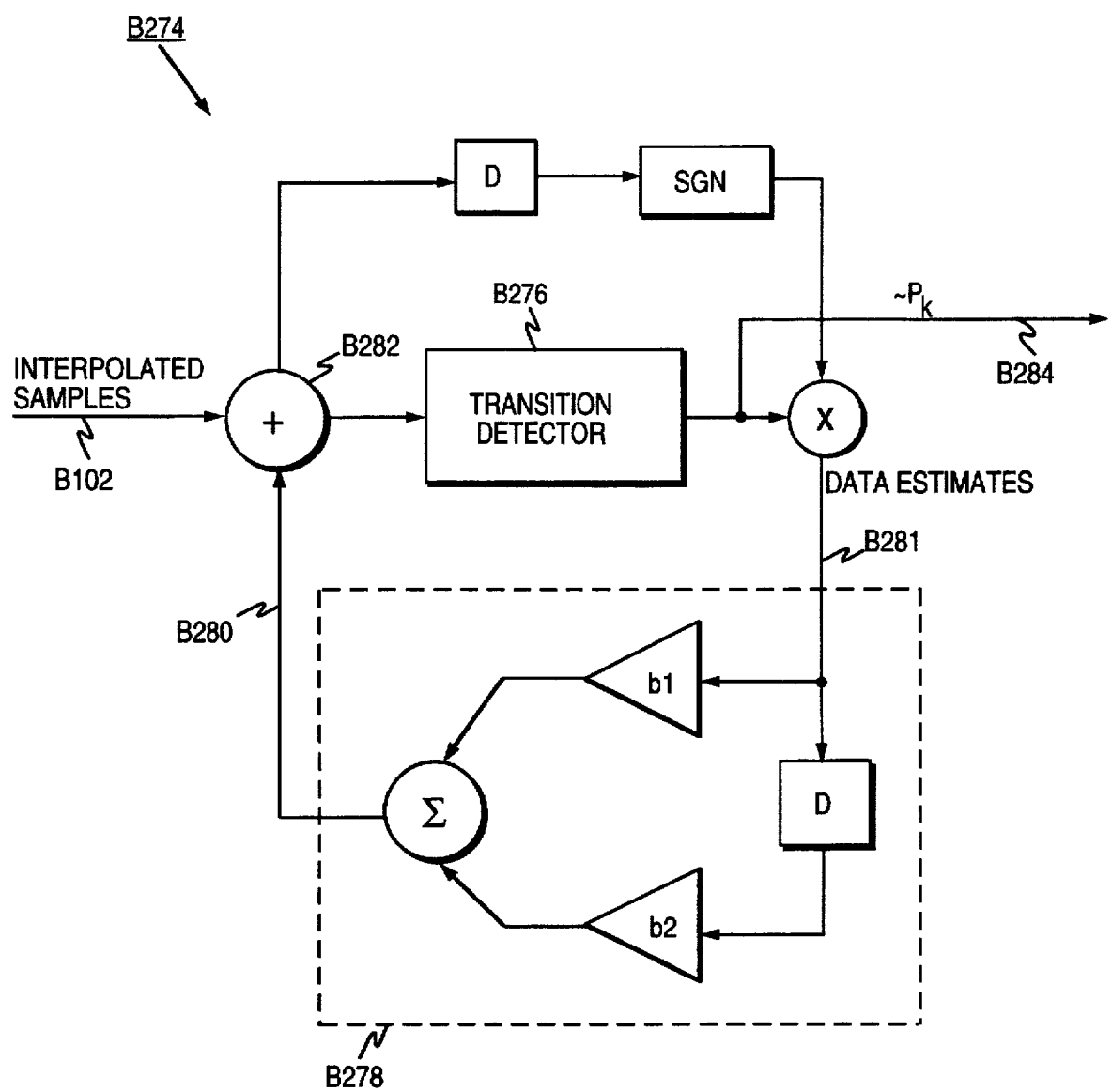
FIG. 12 illustrates an embodiment for the DFE transition detector of the present invention for use timing recovery of a d=1 sub-sampled read channel.

FIG. 12 shows a block diagram of the DFE transition detector B274 of FIG. 11. The decision feedback equalization (DFE) of FIG. 12 is implemented by filtering B278 data estimates B281 computed as the sign of the sample value at an estimated transition at the output of transition detector B276 (see the above referenced U.S. Pat. No. 5,329,544 entitled "Digital Pulse Detector", and adding the filter output B280 to the interpolated samples B102 at adder B282. Consequently, the decision directed equalization improves the accuracy of the transition detector B276 when the analog read signal 62 is sub-sampled.

For a d=1 read channel, the sequence detector 34 shown in FIG. 10 can be implemented using conventional techniques, and preferably it is implemented as a reduced complexity Viterbi type sequence detector (see the above referenced U.S. Pat. No. 5,291,499). Referring again to FIG. 9B, the insensitivity of an optimal MLSD system to sub-sampling at up to one half the baud rate indicates that a conventional read channel will also operate adequately in the presence of sub-sampling. Computer simulations have established a preferred sub-sampling rate of ⅔ the baud rate when using a conventional d=1, rate ⅔ code. In practice, a sampling rate slightly higher (e.g., 1%–5% higher) than ⅔ the baud rate is selected in order to implement the masking operation of the data clock B104 as described above with reference to FIG. 5. Thus, in FIG. 11 the frequency synthesizer 52 clocks the A/D 24, discrete time equalizer filter 26, and interpolator B122 at slightly over ⅔ the baud rate, and the frequency synthesizer 52 clocks the data clock AND gate B126 at slightly over the baud rate over line B121.

An alternative to a conventional Viterbi type sequence detector and interpolated timing recovery is to employ a modified sequence detector matched to a sub-sampled trellis model. Although a sequence detector matched to the sub-sampled read signal loses performance (its performance is closer to that of a conventional peak detector), its complexity is significantly reduced. This alternative embodiment of the present invention is described in the following section.

Matched d=1 Sub-sampled Read Channel

Figure 13A:
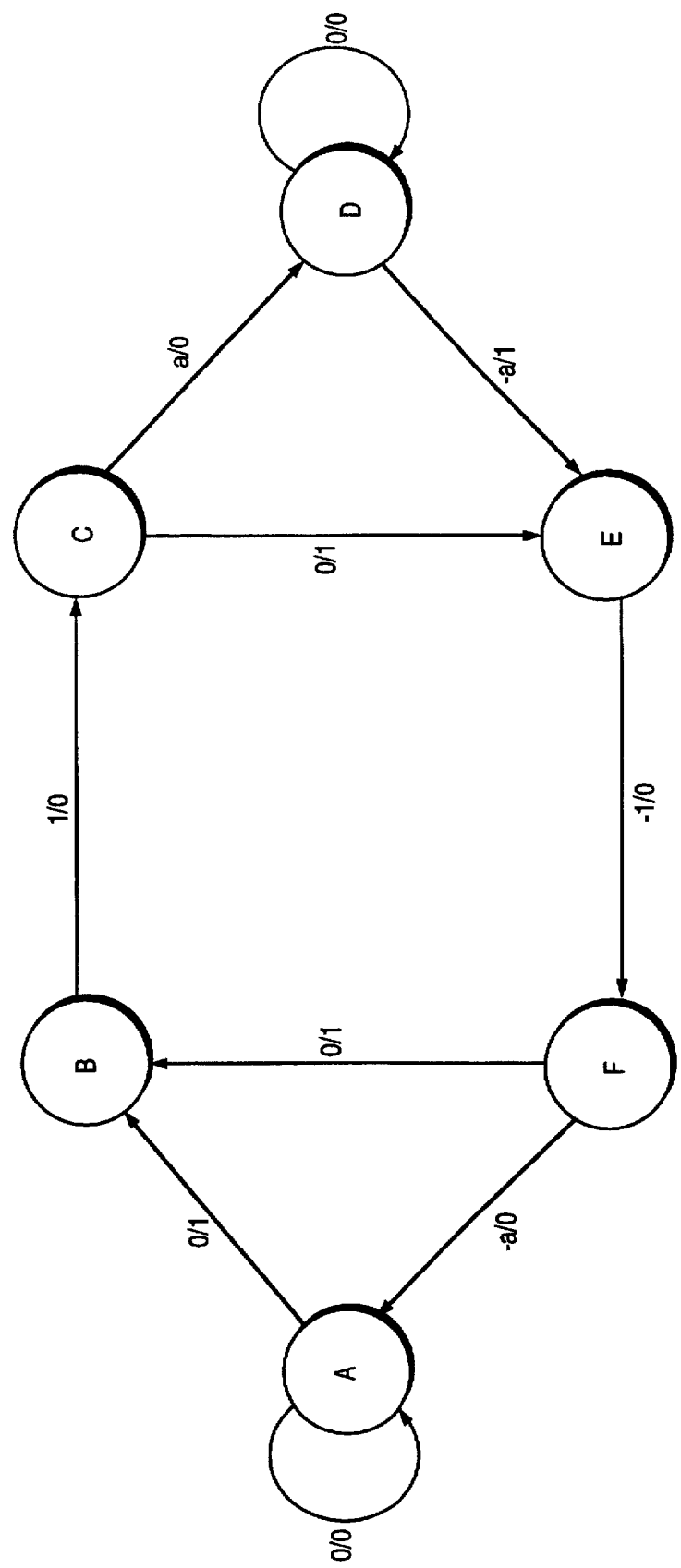
FIG. 13A is a transition state diagram for a conventional d=1 EPR4 Viterbi type sequence detector.

A matched, d=1, sub-sampled sequence detector can be defined as follows: modify the state transition diagram of a conventional d=1 sequence detector to match the state transitions of a sub-sampled sequence detector. FIG. 13A is a state transition diagram of a conventional EPR4, d=1 full sample rate system. In the state diagram, each circle represents a state in the sampled read signal (sample instance), and the arrowed lines represent a transition from a current state to a next state given the next input sample value. Each state transition is labeled with a designator s/b where s represents the sample value and b represents the corresponding bit value of the detected binary sequence.

The preferred embodiment of the present invention for a matched, d=1, sub-sampled sequence detector is to sub-sample by ½ the baud rate and equalize to an EPR4 response. The sub-sampling can be implemented using the conventional synchronous sampling PLL as shown in FIG. 4A (i.e., synchronously sample the read signal at ½ the baud rate). Alternatively, the sub-sampling can be implemented using the interpolated timing recovery circuit of FIG. 4B by asynchronously sampling the read signal at slightly higher than ½ the baud rate, and then synchronizing to ½ the baud rate through interpolation.

Figure 13B:
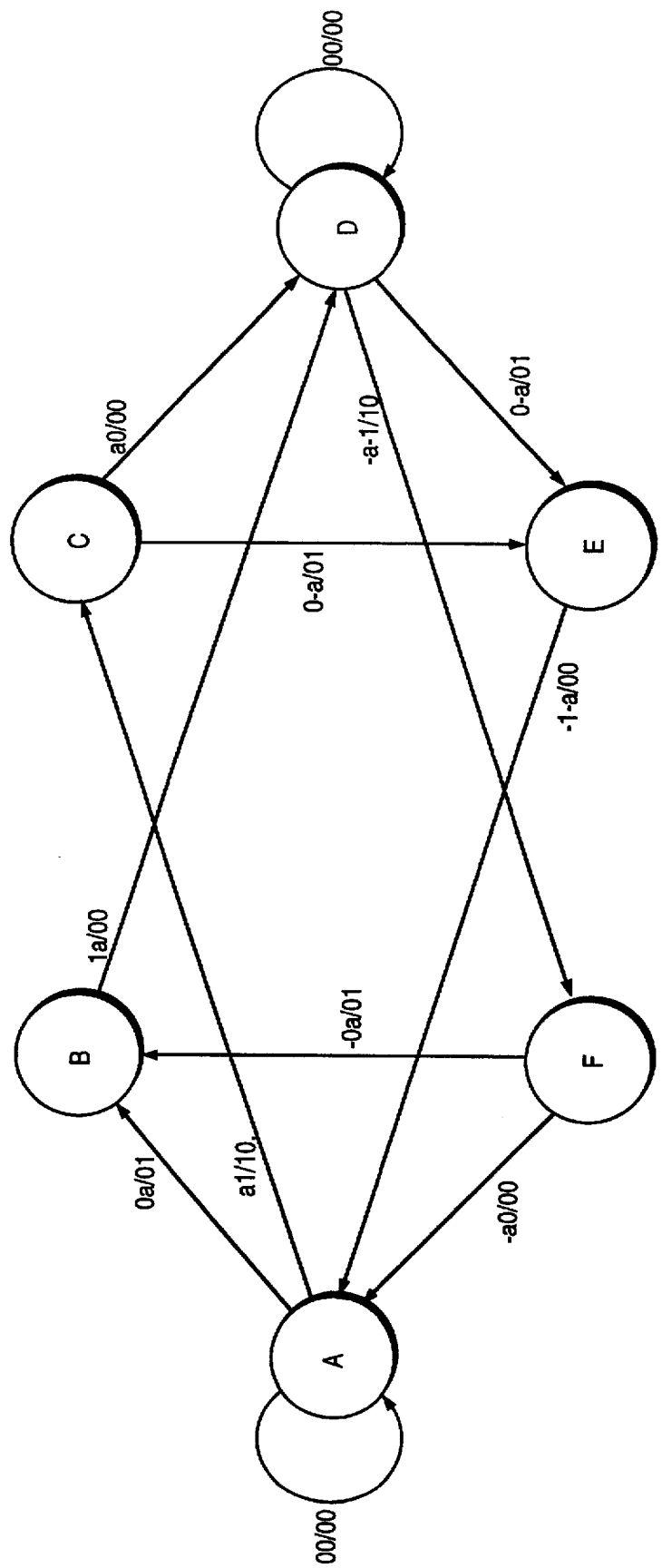
FIG. 13B is a transition state diagram of a modified EPR4 Viterbi type sequence detector matched to a read signal sub-sampled by ½ the baud rate.

The modified state transition diagram corresponding to a ½ sub-sample rate, EPR4, d=1 read signal is shown in FIG. 13B. Each state transition is labeled with a designator (s1,s2)/(b1,b2) where (s1,s2) represents two signal sample values and (b1,b2) represents two bit values corresponding to the detected binary sequence. As can be seen, the s1 and s2 sample values are different between the state transitions leaving any particular state. Thus, sub-sampling at ½ the baud rate is equivalent to evaluating only one of the sample values, s1 or s2.

If only the s2 sample values are evaluated, then the state diagram of FIG. 13B can be simplified by combining states C and D and combining states A and F because the state transitions are equivalent. To clarify, consider the case where the current state is A. If the input sample value s2 is 1, then the detected output bits are 10 and the next state is C. From state C, if the next sample value s2 is 0, then the detected output bits are 00 and the next state is D. Similarly, if the next input sample value s2 is again 0, then the detected output bits are again 00 and the next state remains D. From state C, if the next sample value s2 is −a, then the detected output bits are 01 and the next state is E. Similarly, from state D if the next sample value s2 is −a, then the detected output bits are 01 and the next state is state E. Thus, the states C and D can be combined since the input sample sequences that end in state E generate the same output bit sequences. A similar analysis proves that states A and F can be combined without any loss in performance.

Figure 13C:
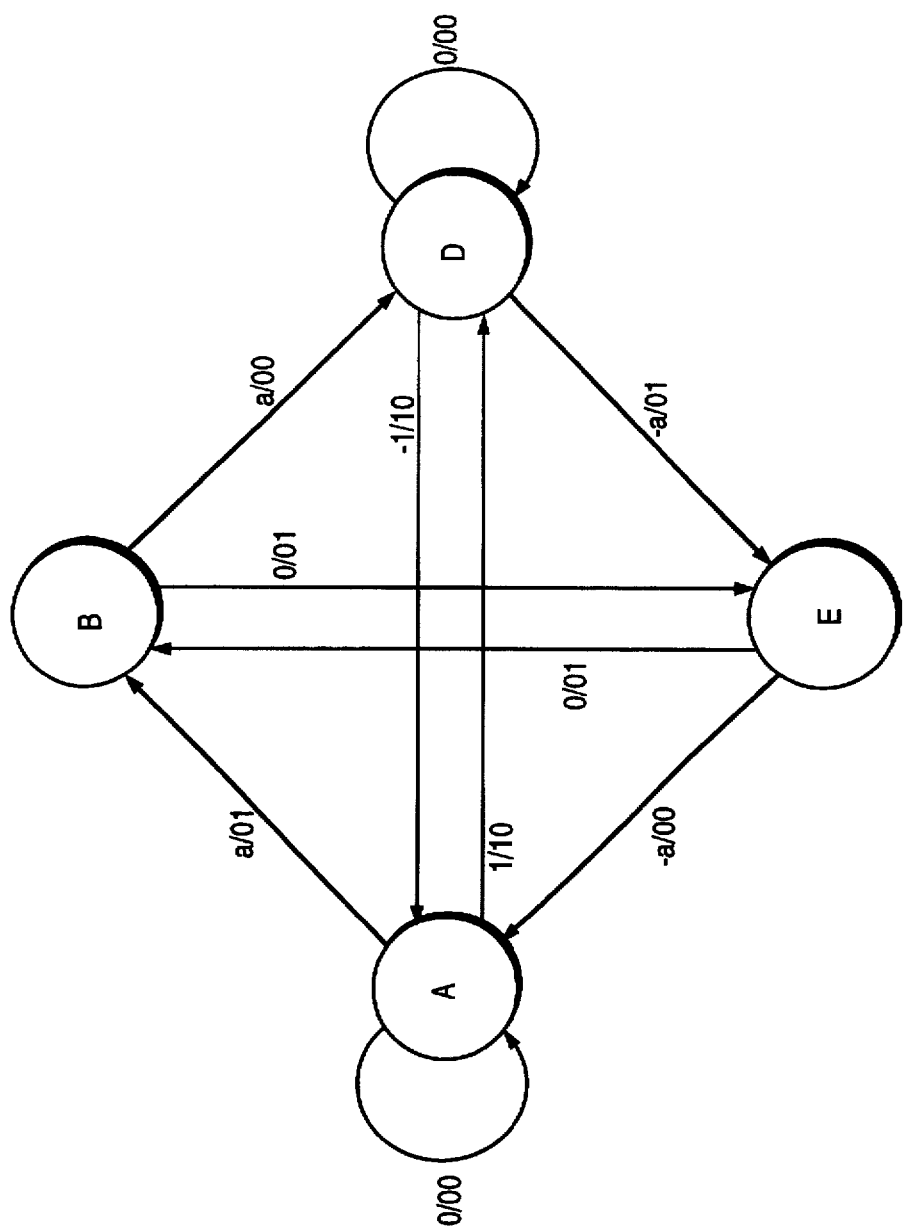
FIG. 13C is a simplified version of the transition state diagram shown in FIG. 13B.

The simplified state transition diagram as a result of combining states C and D and combining states A and F is shown in FIG. 13C. Because there are only four states, as opposed to six states in the conventional EPR4 diagram of FIG. 13A, the implementation of the ACS type of Viterbi sequence detector is significantly reduced.

However, due to sub-sampling, the phase error detector in the timing recovery circuit must be modified (whether synchronous sampling as in FIG. 4A or synchronous interpolation as in FIG. 4B). Note that the simplified state transition diagram of FIG. 13C is similar to a conventional PR4 state diagram. In fact, if all of the channel transitions occurred in one interleave (i.e., b2), then the state diagram would be exactly that of PR4. Computer simulations have verified that the phase error detector of a conventional PR4 read channel will produce valid phase error estimates for the EPR4 sub-sampled read channel of the present invention except for a few cases. For example, when the transitions change from one interleave to the other, the estimated phase error will be correct in magnitude but incorrect in sign. This indicates that in the presence of random data, the timing loop may become unstable.

A computer search was carried out to determine the data sequences that can cause erroneous phase error estimates. This was accomplished by injecting a sampled read signal with a known timing offset into a conventional PR4 phase error detector, and measuring the computed phase error for all possible data sequences. The algorithm for the phase error detector was then modified accordingly to compensate for those data sequences which resulted in an invalid phase error.

Figure 14:
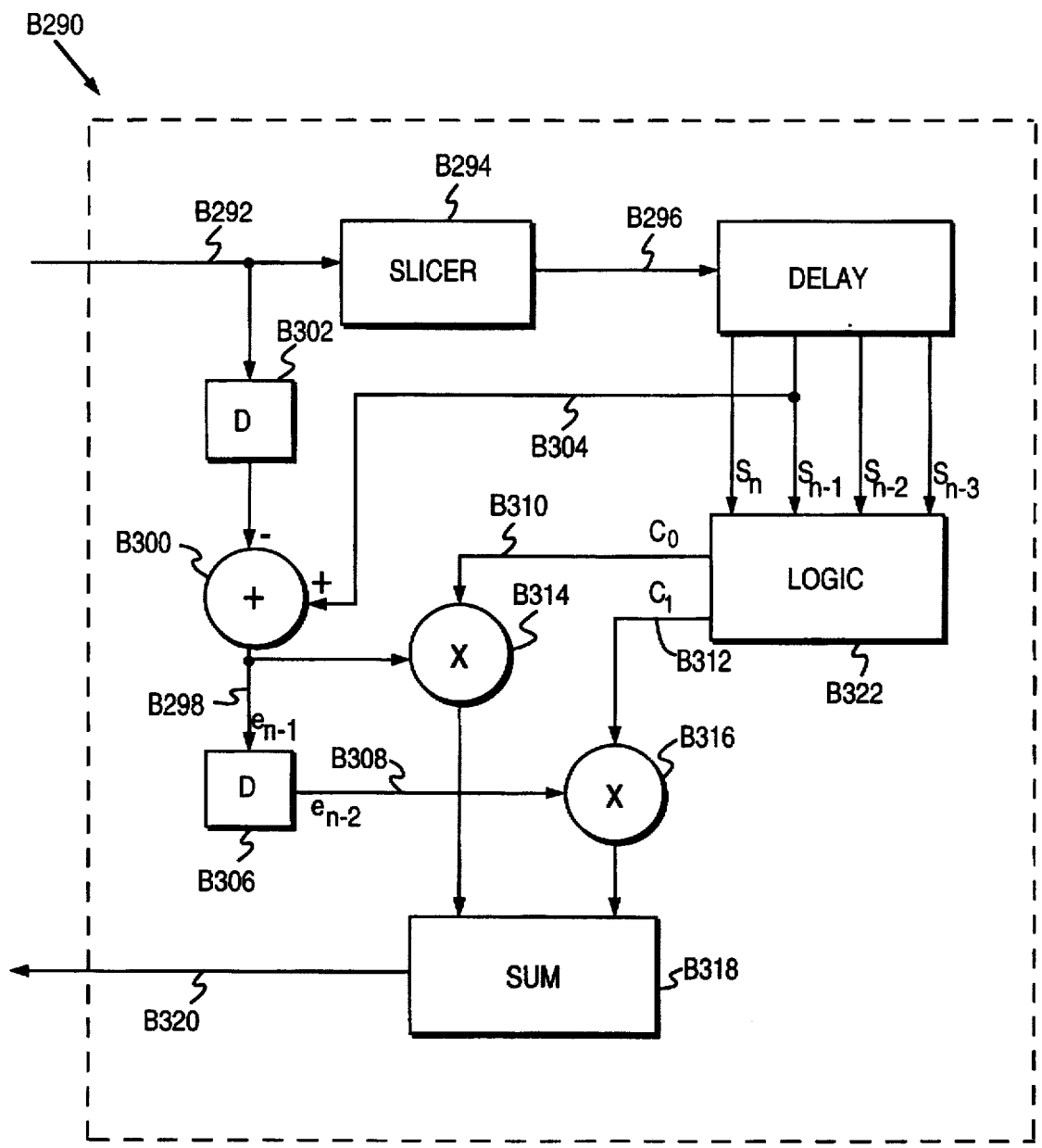
FIG. 14 is a block diagram of the phase error detector for use in the d=1, EPR4, sub-sampled read channel of the present invention.

FIG. 14 is a block diagram of the modified PR4 phase error detector B290 for use in the matched, d=1, sub-sampled read channel of the present invention. Note again that the modified PR4 detector B290 of FIG. 14 can be used in place of the phase error detector B155 in the synchronous sampling timing recovery circuit of FIG. 4A or in the interpolated timing recovery circuit of FIG. 4B. In operation, the synchronous sample values B292 are input into a slicer (threshold detector) B294 which outputs estimated ideal sample values B296 (for EPR4, the estimated output values can take on values selected from −2, −1, 0, +2, and +2). The estimated sample values B296 are then delayed B298 to generate a sequence of delayed estimated sample values $S_n$, $S_{n-1}$, $S_{n-2}$, and $S_{n-3}$. A sample error value $e_{n-1}$ B298 is generated at adder B300 by subtracting the read signal sample value B292 (delayed B302 one clock period) from the $S_{n-1}$ estimated sample value B304. The sample error value $e_{n-1}$ B298 is delayed B306 to generate a second sample error value $e_{n-2}$ B308. The sample error values are then scaled by coefficients $C_0$ B310 and $C_1$ B312 at respective multipliers B314 and B316, where the scaling coefficients $C_0$ B310 and $C_1$ B312 are computed as a function of the estimated sample values $S_n$, $S_{n-1}$, $S_{n-2}$, and $S_{n-3}$ in order to compensate for the data sequences that cause erroneous phase error estimates. Logic B322 comprises two lookup tables indexed by the sample value estimates $S_n$, $S_{n-1}$, $S_{n-2}$, and $S_{n-3}$ for generating the coefficients, where the table entries were determined according to the computer search described above. The values for coefficient $C_0$ B310 are shown in Table B8, and the values for coefficient $C_1$ B312 are shown in Table B9.

The scaled sample error signals at the output of multipliers B314 and B316 are added at adder B318, the output of which is the phase error estimate B320. The phase error estimate is input into the timing loop filter of FIG. 4A or 4B as described above.

Sub-Sampled Timing Acquisition

Referring again to FIG. 2B, each sector 15 of data comprises an acquisition preamble field 68 used to synchronize timing recovery 28 to the baud rate before reading the user data 72. The resulting read signal during acquisition is a periodic waveform, such as the sinusoidal 2T acquistion preamble shown in FIG. 5. As explained above with reference to FIG. 4B, the periodicity of the preamble 68 facilitates generating expected sample values for use in computing the phase error. The reference NT denotes the period of the preamble when it is written to the disk (e.g., for a 2T preamble the symbol sequence −b(n) 12 written to the disk is 1010101010101 . . . ).

Referring again to the conventional timing recovery circuit shown in FIG. 4A, the PLL processes the acquistion preamble 68 in order to synchronize the sampling VFO clock 23 to the baud rate. And for interpolated timing recovery shown in FIG. 4B, the acquisition preamble 68 is processed to compute the starting value for the interpolation interval τ B128 before tracking the user data 72. In either case, the acquistion time should be as short as possible in order to minimize the length of the preamble 68, thereby reserving more disk space for user data.

Computer simulations have shown that increasing the period of the acquisition preamble 68 in the presence of sub-sampling optimizes the acquisition process. For the d=1 read channel of FIG. 10, when sub-sampling at ⅔ the baud rate a 3T acquisition preamble (100100100 ...) is preferred, and when sub-sampling at ½ the buad rate a 4T acquisition preamble (100010001000 ...) is preferred.

The objects of the invention have been fully realized through the embodiments disclosed herein. Those skilled in the art will appreciate that the various aspects of the invention can be achieved through different embodiments without departing from the essential function. For instance, a combination of synchronous sampling timing recovery and interpolation could be employed by synchronously sampling at ½ the baud rate and then up-sampling at a fixed phase to the full baud rate. This, and other like modifications are within the scope of the present invention. The particular embodiments disclosed are illustrative and not meant to limit the scope of the invention as appropriately construed from the following claims.

TABLE 1

| Channel | Transfer Function | Dipulse Response |
|---|---|---|
| PR4 | $(1 - D)(1 + D)$ | 0, 1, 0, −1, 0, 0, 0, ... |
| EPR4 | $(1 - D)(1 + D)^2$ | 0, 1, 1, −1, −1, 0, 0, ... |
| EEPR4 | $(1 - D)(1 + D)^3$ | 0, 1, 2, 0, −2, −1, 0, ... |

TABLE B2

| τ · 32/Ts | C (−2) | C (−1) | C (0) | C (1) | C (2) | C (3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |

TABLE B2-continued

| τ · 32/Ts | C (−2) | C (−1) | C (0) | C (1) | C (2) | C (3) |
|---|---|---|---|---|---|---|
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

TABLE B3

| PR4 Output | | SNRZI | | PR4 Output | | SNRZI | |
|---|---|---|---|---|---|---|---|
| $D_{n-1}$ | $D_n$ | $S_{n-1}$ | $S_n$ | $D_{n-1}$ | $D_n$ | $S_{n-1}$ | $S_n$ |
| +0 | +0 | +0 | +0 | +1 | +0 | +0 | +0 |
| +0 | −0 | +1 | −1 | +1 | +1 | +1 | +0 |
| −0 | −0 | −0 | +0 | +1 | −1 | +0 | −1 |
| −0 | +0 | −1 | +1 | −1 | −0 | −0 | −0 |
| +0 | −1 | +0 | −1 | −1 | +1 | −0 | +1 |
| −0 | +1 | −0 | +1 | −1 | −1 | −1 | −0 |
| +0 | +1 | +1 | +0 | +1 | −0 | +1 | −1 |
| −0 | −1 | −1 | −0 | −1 | +0 | −1 | +1 |

TABLE B4

| SNRZI | | | MODIFIED SNRZI | SNRZI | | | MODIFIED SNRZI |
|---|---|---|---|---|---|---|---|
| $S_{n-2}$ | $S_{n-1}$ | $S_n$ | $SP_{n-1}$ | $S_{n-2}$ | $S_{n-1}$ | $S_n$ | $SP_{n-1}$ |
| 0 | +1 | 0 | −1 | 0 | −1 | 0 | −1 |
| −1 | +1 | 0 | $+A_{PB}$ | +1 | −1 | 0 | $-A_{PB}$ |
| 0 | +1 | −1 | $+A_{PB}$ | 0 | −1 | +1 | $-A_{PB}$ |
| −1 | +1 | −1 | $+(A_{PB} * A_{PB})$ | +1 | −1 | +1 | $-(A_{PB} * A_{PB})$ |

TABLE B5

(C1 Error Event)

| | Expected PR4 | | Corrected PR4 | | | Expected PR4 | | Corrected PR4 | |
|---|---|---|---|---|---|---|---|---|---|
| F11 | $D_{n+6}$ | $D_{n+4}$ | $D_{n+6}$ | $D_{n+4}$ | F11 | $D_{n+6}$ | $D_{n+4}$ | $D_{n+6}$ | $D_{n+4}$ |
| 0 | +1 | −1 | +0 | +0 | 1 | −1 | +1 | −0 | −0 |
| 0 | −0 | −1 | −1 | +0 | 1 | +0 | +1 | +1 | −0 |
| 0 | +1 | −0 | +0 | +1 | 1 | −1 | +0 | −0 | −1 |
| 0 | −0 | −0 | −1 | +1 | 1 | +0 | +0 | +1 | −1 |

TABLE B6

(C2 Error Event)

| F22 | Expected PR4 $D_{n+6}$ | $D_{n+4}$ | $D_{n+2}$ | Corrected PR4 $D_{n+6}$ | $D_{n+4}$ | $D_{n+2}$ | F22 | Expected PR4 $D_{n+6}$ | $D_{n+4}$ | $D_{n+2}$ | Corrected PR4 $D_{n+6}$ | $D_{n+4}$ | $D_{n+2}$ |
|---|---|---|---|---|---|---|---|---|---|---|---|---|---|
| 0 | +1 | -0 | -1 | +0 | +0 | +0 | 1 | -1 | +0 | +1 | -0 | -0 | -0 |
| 0 | -0 | -0 | -1 | -1 | +0 | +0 | 1 | +0 | +0 | +1 | +1 | -0 | -0 |
| 0 | +1 | -0 | -0 | +0 | +0 | +1 | 1 | -1 | +0 | +0 | -0 | -0 | -1 |
| 0 | -0 | -0 | -0 | -1 | +0 | +1 | 1 | +0 | +0 | +0 | +1 | -0 | -1 |

TABLE B7

(C3 Error Event)

| F33 | Expected PR4 $D_{n+6}$ | $D_{n+4}$ | $D_{n+2}$ | $D_n$ | Corrected PR4 $D_{n+6}$ | $D_{n+4}$ | $D_{n+2}$ | $D_n$ | F33 | Expected PR4 $D_{n+6}$ | $D_{n+4}$ | $D_{n+2}$ | $D_n$ | Corrected PR4 $D_{n+6}$ | $D_{n+4}$ | $D_{n+2}$ | $D_n$ |
|---|---|---|---|---|---|---|---|---|---|---|---|---|---|---|---|---|---|
| 0 | +1 | -0 | -0 | -1 | +0 | +0 | +0 | +0 | 1 | -1 | +0 | +0 | -1 | -0 | -0 | -0 | -0 |
| 0 | -0 | -0 | -0 | -1 | -1 | +0 | +0 | +0 | 1 | +0 | +0 | +0 | +1 | +1 | -0 | -0 | -0 |
| 0 | +1 | -0 | -0 | -0 | +0 | +0 | +0 | +1 | 1 | -1 | +0 | +0 | +0 | -0 | -0 | -0 | -1 |
| 0 | -0 | -0 | -0 | -0 | -1 | +0 | +0 | +1 | 1 | +0 | +0 | +0 | +0 | +1 | -0 | -0 | -1 |

TABLE B8

| $S_n$ →   | -2 | -1 | 0  | 1  | 2  | -2 | -1 | 0  | 1  | 2  | -2 | -1 | 0  | 1  | 2  | -2 | -1 | 0  | 1  | 2  | -2 | -1 | 0  | 1  | 2  |
|-----------|----|----|----|----|----|----|----|----|----|----|----|----|----|----|----|----|----|----|----|----|----|----|----|----|----|
| $S_1$ →   | -2 | -2 | -2 | -2 | -2 | -1 | -1 | -1 | -1 | -1 | 0  | 0  | 0  | 0  | 0  | 1  | 1  | 1  | 1  | 1  | 2  | 2  | 2  | 2  | 2  |
| $S_2$ $S_3$ | | | | | | | | | | | | | | | | | | | | | | | | | |
| -2 -2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -1 -2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 -2  | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| 1 -2  | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 -2  | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| 2 -1  | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -1 -1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| 0 -1  | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| 1 -1  | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 -1  | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| -2 0  | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| -1 0  | 1 | 1 | 1 | 1 | 1 | 1 | 1 | -1 | -1 | -1 | 1 | 1 | -1 | -1 | 0 | 1 | 1 | -1 | -1 | 1 | 0 | 0 | 0 | 1 | 1 |
| 0 0   | 1 | 1 | 0 | 0 | 0 | 1 | 1 | 1 | -1 | -1 | 0 | 0 | 0 | 0 | 1 | 1 | -1 | -1 | 1 | 0 | 0 | 0 | 1 | 1 | 1 |
| 1 0   | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| 2 0   | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| -2 1  | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| -1 1  | 1 | 1 | 1 | 1 | 1 | 1 | 1 | -1 | -1 | -1 | 1 | 1 | -1 | -1 | 1 | 1 | 1 | 1 | 1 | 1 | 1 | 1 | 1 | 1 | 1 |
| 0 1   | 1 | 1 | 0 | 0 | 0 | 1 | 1 | 1 | -1 | -1 | 0 | 0 | -1 | 1 | 1 | 1 | 1 | 1 | 1 | 1 | 1 | 1 | 1 | 1 | 1 |
| 1 1   | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| 2 1   | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -2 2  | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 | 1 | 1 |
| -1 2  | 1 | 1 | 1 | 1 | 1 | 1 | 1 | -1 | -1 | -1 | 1 | 1 | -1 | -1 | 1 | 1 | 1 | 1 | 1 | 1 | 1 | 1 | 1 | 1 | 1 |
| 0 2   | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 | 1 |
| 1 2   | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 2   | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

TABLE B9

| $S_n$ →   | -2 | -1 | 0  | 1  | 2  | -2 | -1 | 0  | 1  | 2  | -2 | -1 | 0  | 1  | 2  | -2 | -1 | 0  | 1  | 2  | -2 | -1 | 0  | 1  | 2  |
|-----------|----|----|----|----|----|----|----|----|----|----|----|----|----|----|----|----|----|----|----|----|----|----|----|----|----|
| $S_1$ →   | -2 | -2 | -2 | -2 | -2 | -1 | -1 | -1 | -1 | -1 | 0  | 0  | 0  | 0  | 0  | 1  | 1  | 1  | 1  | 1  | 2  | 2  | 2  | 2  | 2  |
| $S_2$ $S_3$ | | | | | | | | | | | | | | | | | | | | | | | | | |
| -2 -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 -2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 -2  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

TABLE B9-continued

| | | | | | | | | | | | | | $S_0$ | | | | | | | | | | | | | |
|---|---|---|---|---|---|---|---|---|---|---|---|---|---|---|---|---|---|---|---|---|---|---|---|---|---|---|
| | | -2 | -1 | 0 | 1 | 2 | -2 | -1 | 0 | 1 | 2 | -2 | -1 | 0 | 1 | 2 | -2 | -1 | 0 | 1 | 2 | -2 | -1 | 0 | 1 | 2 |
| | | | | | | | | | | | | | | $S_1$ | | | | | | | | | | | | |
| $S_2$ | $S_3$ | -2 | -2 | -2 | -2 | -2 | -1 | -1 | -1 | -1 | -1 | 0 | 0 | 0 | 0 | 0 | 1 | 1 | 1 | 1 | 1 | 2 | 2 | 2 | 2 | 2 |
| 2 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | -1 | 0 | 0 | 0 | 0 | 0 | 0 | 0 | 0 | 0 | 0 | -1 | -1 | -1 | 0 | 0 | 0 | 0 | 0 | -1 | -1 | -1 | 0 | 0 | 0 | 0 |
| 0 | -1 | 0 | 0 | 0 | 0 | 0 | 0 | 0 | 0 | 0 | 0 | 0 | 0 | 0 | 0 | 0 | -1 | 0 | 0 | 0 | 0 | 0 | 0 | 0 | 0 | 0 |
| 1 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 0 | 0 | 0 | 0 | 0 | 0 | 0 | 0 | 0 | 0 | 0 | -1 | -1 | -1 | 0 | 0 | 0 | 0 | 0 | -1 | -1 | -1 | 0 | 0 | 0 | 0 |
| 0 | 0 | 0 | 0 | 0 | 0 | 0 | 0 | 0 | 1 | 0 | 0 | 0 | 0 | 0 | 0 | 0 | -1 | 0 | 0 | 0 | 0 | 0 | 0 | 0 | 0 | 0 |
| 1 | 0 | 0 | 0 | 1 | 1 | 1 | 0 | 0 | 0 | 0 | 0 | 1 | 1 | 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 1 | 1 | 0 | 0 | 0 | 0 | 0 | 1 | 1 | 1 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

We claim:

1. A sampled amplitude read channel for reading binary data from a sequence of interpolated discrete time sample values generated by sampling pulses in an analog read signal from a read head positioned over a disk storage medium, the binary data recorded at a predetermined baud rate, the read channel comprising:

(a) a sampling device for sub-sampling the analog read signal at a sampling rate less than or equal to 9/10 the baud rate to generate sub-sampled values;

(b) an interpolator, responsive to the sub-sampled values, for generating the interpolated sample values; and (c) a discrete time detector for generating a detected sequence from the interpolated sample values.

2. The sampled amplitude read channel as recited in claim 1, wherein the discrete time detector operates according to a code constraint which increases a minimum distance error event.

3. The sampled amplitude read channel as recited in claim 2, wherein the code constraint is a (d,k) run length limited code constraint where d>0.

4. The sampled amplitude read channel as recited in claim 1, wherein the interpolator comprises:

(a) a frequency offset generator for generating a frequency offset $\Delta f$ proportional to a frequency difference between a sampling clock and the baud rate; and (b) a mod-Ts accumulator for accumulating, modulo-Ts, the frequency offset $\Delta f$ to generate an interpolation interval $\tau$ where Ts is a predetermined sample period of the sampling clock.

5. The sampled amplitude read channel as recited in claim 4, wherein the frequency offset generator comprises:

(a) a phase error detector for detecting a phase error $\Delta\theta$ between an interpolated sample value and an estimated sample value; and (b) a loop filter for filtering the phase error $\Delta\theta$ to generate the frequency offset $\Delta f$.

6. The sampled amplitude read channel as recited in claim 5, wherein the phase error detector comprises a discrete time pulse detector.

7. The sampled amplitude read channel as recited in claim 6, wherein the discrete time pulse detector comprises decision feedback equalization.

8. The sampled amplitude read channel as recited in claim 6, further comprising a first equalizer for generating first equalized sample values, and a second equalizer for generating second equalized sample values, wherein:

(a) the discrete time pulse detector is responsive to the first equalized sample values; and (b) the discrete time detector is responsive to the second equalized sample values.

9. The sampled amplitude read channel as recited in claim 1, wherein the interpolator is responsive to an interpolation interval $\tau$ proportional to a time difference between a channel sample value and a desired interpolated sample value.

10. The sampled amplitude read channel as recited in claim 9, wherein the interpolator comprises an actual interpolation filter having an actual impulse response h(k) which approximates an ideal impulse response of an ideal interpolation filter:

$$\text{sinc }(\pi \cdot (k-\tau/Ts));$$

where:

k is a time index; and

Ts is a sample period of the sampling clock.

11. The sampled amplitude read channel as recited in claim 9, wherein the interpolator comprises an actual interpolation filter having an actual impulse response h(k) generated by minimizing a mean squared error between a frequency response of the actual interpolation filter and an ideal frequency response corresponding to an ideal interpolation filter.

12. The sampled amplitude read channel as recited in claim 9, wherein:

(a) the interpolator comprises an actual interpolation filter; and (b) a plurality of coefficients $C_{\tau,k}$ of the actual interpolation filter are computed in real time as a function of $\tau$.

13. The sampled amplitude read channel as recited in claim 1, wherein the interpolator further generates a data clock for clocking the discrete time detector.

14. The sampled amplitude read channel as recited in claim 1, wherein the discrete time detector operates according to a state transition diagram matched to a non-linear characteristic of the read signal.

15. The sampled amplitude read channel as recited in claim 14, wherein the non-linear effect is ea partial erasure effect which is a non-linear reduction in amplitude of a primary pulse caused by secondary pulses located near the primary pulse.

16. The sampled amplitude read channel as recited in claim 1, wherein the discrete time detector comprises:

(a) a demodulator, responsive to the interpolated sample values, for detecting a preliminary sequence having one or more bit errors;

(b) a remodulator for converting the preliminary sequence into a sequence of estimated sample values;

(c) an adder, responsive to the interpolated sample values and the estimated sample values, for generating a sequence of sample error values;

(d) an error pattern detector, responsive to the sequence of sample error values, for detecting a magnitude and location of the bit errors in the preliminary sequence; and (e) an error corrector, responsive to the magnitude and location of the bit errors, for correcting the preliminary sequence.

17. The sampled amplitude read channel as recited in claim 16, wherein the demodulator outputs a sign and magnitude of the preliminary sequence.

18. The sampled amplitude read channel as recited in claim 16, wherein the remodulator comprises a NRZI converter for converting the preliminary sequence into an NRZI sequence.

19. The sampled amplitude read channel as recited in claim 16, wherein the remodulator comprises a partial erasure compensator which compensates for the non-linear reduction in amplitude of a primary pulse caused by secondary pulses located near the primary pulse.

20. The sampled amplitude read channel as recited in claim 16, wherein the error pattern detector comprises a plurality of discrete time filters each matched to a predetermined error event.

21. The sampled amplitude read channel as recited in claim 16, further comprising a means for converting the sequence of sample error values from a lower order partial response domain to a higher partial response domain, wherein the error pattern detector detects the bit errors in the higher order partial response domain.

22. The sampled amplitude read channel as recited in claim 16, wherein the demodulator comprises a PR4 sequence detector.

23. The sampled amplitude read channel as recited in claim 16, wherein the discrete time detector further comprises an error detection validator for checking the validity of a detected error event.

24. A sampled amplitude read channel for reading binary data from a sub-sampled sequence of discrete time sample values generated by sub-sampling pulses in an analog read signal from a read head positioned over a disk storage medium, the binary data recorded at a predetermined baud rate, the read channel comprising:

(a) a sampling device for sub-sampling the analog read signal at a sampling rate less than or equal to 9/10 the baud rate to generate sub-sampled values;

(b) timing recovery for synchronizing the sub-sampled values to generate synchronous sample values; and (c) a discrete time sequence detector for detecting the binary data from the synchronous sample values.

25. The sampled amplitude read channel as recited in claim 24, wherein the discrete time detector operates according to a state transition diagram matched to a non-linear characteristic of the read signal.

26. The sampled amplitude read channel as recited in claim 25, wherein the non-linear effect is a partial erasure effect which is a non-linear reduction in amplitude of a primary pulse caused by secondary pulses located near the primary pulse.

27. The sampled amplitude read channel as recited in claim 24, wherein the sequence detector operates according to a state transition diagram substantially matched to a sub-sampled read signal.

28. The sampled amplitude read channel as recited in claim 24, wherein the sampling rate is within 10 percent of ½ the baud rate.

29. The sampled amplitude read channel as recited in claim 27, wherein the state transition diagram is:

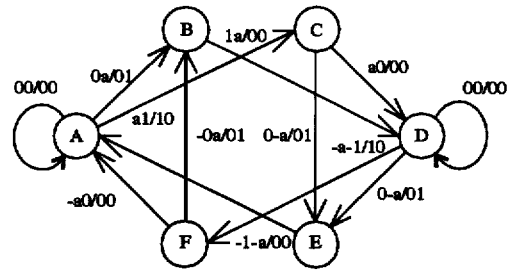

30. The sampled amplitude read channel as recited in claim 27, wherein the state transition diagram is:

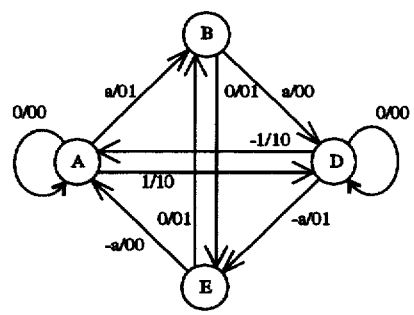

31. The sampled amplitude read channel as recited in claim 24, wherein the timing recovery comprises a phase error estimator comprising:

(a) a slicer, responsive to the synchronous sample values, for generating estimated sample values;

(b) control logic, responsive to a plurality of the estimated sample values, for generating at least one gradient coefficient;

(c) an adder, responsive to the synchronous sample values and estimated sample values, for generating sample error values; and (d) a multiplier for multiplying a sample error value by the gradient coefficient, the multiplication for use in generating an estimated phase error.

32. The sampled amplitude read channel as recited in claim 24, wherein:

(a) timing recovery operates on sub-sample values of an acquisition preamble recorded prior to user data; and (b) the acquisition preamble is written to the disk with a period greater than twice the baud rate.

33. A sampled amplitude read channel for reading user data from a sequence of interpolated discrete time sample values generated by sampling pulses in an analog read signal from a read head positioned over a disk storage medium, the user data encoded into codewords according to a code rate<1, the codewords recorded to the disk storage medium at a predetermined baud rate, the read channel comprising:

(a) a sampling device for sub-sampling the analog read signal at a sampling rate less than the user data rate;

(b) an interpolator, responsive to the sub-sampled values, for generating the interpolated sample values; and (c) a discrete time detector for generating a detected sequence from the interpolated sample values.

34. The sampled amplitude read channel as recited in claim 33, wherein the discrete time detector operates according to a state transition diagram matched to a non-linear characteristic of the read signal.

35. The sampled amplitude read channel as recited in claim 34, wherein the non-linear effect is a partial erasure effect which is a non-linear reduction in amplitude of a primary pulse caused by secondary pulses located near the primary pulse.

36. A sampled amplitude read channel for reading user data from a sequence of interpolated discrete time sample values generated by sampling pulses in an analog read signal from a read head positioned over a disk storage medium, the user data encoded into codewords according to a code rate<1, the codewords recorded to the disk storage medium at a predetermined baud rate, the read channel comprising:

(a) a sampling device for sub-sampling the analog read signal at a sampling rate less than the user data rate;

(b) timing recovery for synchronizing the sub-sampled values to generate synchronous sample values; and (c) a discrete time sequence detector for detecting the binary data from the synchronous sample values.

37. The sampled amplitude read channel as recited in claim 36, wherein the discrete time detector operates according to a state transition diagram matched to a non-linear characteristic of the read signal.

38. The sampled amplitude read channel as recited in claim 37, wherein the non-linear effect is a partial erasure effect which is a non-linear reduction in amplitude of a primary pulse caused by secondary pulses located near the primary pulse.

39. A method for reading binary data from a sequence of discrete time sample values generated by sampling pulses in an analog read signal from a read head positioned over a storage medium, comprising:

(a) sub-sampling the analog read signal at a sampling rate less than or equal to $9/10$ the baud rate to generate sub-sampled values;

(b) synchronizing the sub-sampled values to generate synchronized sample values; and (c) detecting the binary data from the synchronized sample values.

40. The method for reading digital data as recited in claim 39, wherein the step of detecting the binary data uses a sequence detector that operates according to a state transition diagram substantially matched to a sub-sampled read signal.

41. The method for reading digital data as recited in claim 39, wherein the step of detecting the binary data uses a sequence detector that operates according to a state transition diagram matched to a non-linear characteristic of the read signal.

42. The method for reading digital data as recited in claim 41, wherein the non-linear effect is a partial erasure effect which is a non-linear reduction in amplitude of a primary pulse caused by secondary pulses located near the primary pulse.

* * * * *

UNITED STATES PATENT AND TRADEMARK OFFICE
CERTIFICATE OF CORRECTION

PATENT NO.   : 5,802,118
DATED        : September 1, 1998
INVENTOR(S)  : Bliss et al.

It is certified that error appears in the above-identified patent and that said Letters Patent is hereby corrected as shown below:

<u>Drawings,</u>
FIG. 9B, the heading for the graph "BANDWIDTH AS FRACTION OF QUIST" should read -- BANDWIDTH AS FRACTION OF NYQUIST --.

<u>Column 9,</u>
Line 20, the equation "$Y(N-1) = x(N-1) + \tau \bullet (x(N-1))$"

should read        -- $Y(N-1) = x(N-1) + \tau \bullet (x(N) - x(N-1))$ --.

<u>Column 10,</u>
Line 3, the equation   "$\text{sinc}(\tau \bullet (n-\tau/T_s))$"

should read        -- $\text{sinc}(\pi \bullet (n-\tau/T_s))$ --.

<u>Column 25-26,</u>
Table B8, should read

Table B8

| $S_0$ | -2 | -1 | 0 | 1 | 2 | -2 | -1 | 0 | 1 | 2 | -2 | -1 | 0 | 1 | 2 | -2 | -1 | 0 | 1 | 2 | -2 | -1 | 0 | 1 | 2 |
|---|---|---|---|---|---|---|---|---|---|---|---|---|---|---|---|---|---|---|---|---|---|---|---|---|---|
| $S_1$ | -2 | -2 | -2 | -2 | -2 | -1 | -1 | -1 | -1 | -1 | 0 | 0 | 0 | 0 | 0 | 1 | 1 | 1 | 1 | 1 | 2 | 2 | 2 | 2 | 2 |

| $S_2$ | $S_3$ | | | | | | | | | | | | | | | | | | | | | | | | | |
|---|---|---|---|---|---|---|---|---|---|---|---|---|---|---|---|---|---|---|---|---|---|---|---|---|---|---|
| -2 | -2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -1 | -2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 0 | -2 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| 1 | -2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | -2 | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 |
| -2 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -1 | -1 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| 0 | -1 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| 1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | -1 | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 |
| -2 | 0 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| -1 | 0 | 1 | 1 | 1 | 1 | 1 | 1 | 1 | -1 | -1 | -1 | 1 | 1 | -1 | -1 | 0 | 1 | 1 | -1 | -1 | 1 | 0 | 0 | 0 | 1 | 1 |
| 0 | 0 | 1 | 1 | 0 | 0 | 0 | 1 | 1 | -1 | -1 | 0 | 0 | 0 | 0 | 0 | 1 | 1 | -1 | -1 | 1 | 0 | 0 | 0 | 1 | 1 |
| 1 | 0 | 1 | 1 | 0 | 0 | 0 | 1 | 1 | 1 | 1 | 0 | 1 | 1 | 1 | 1 | 1 | 1 | 1 | 1 | 1 | 1 | 1 | 1 | 1 | 1 |
| 2 | 0 | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 |
| -2 | 1 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| -1 | 1 | 1 | 1 | 1 | 1 | 1 | 1 | -1 | -1 | -1 | 1 | 1 | -1 | -1 | 1 | 1 | 1 | 1 | 1 | 1 | 1 | 1 | 1 | 1 | 1 |
| 0 | 1 | 1 | 1 | 0 | 0 | 0 | 1 | 1 | -1 | -1 | 0 | 0 | 0 | -1 | 1 | 1 | 1 | 1 | 1 | 1 | 1 | 1 | 1 | 1 | 1 |
| 1 | 1 | 1 | 1 | 0 | 0 | 0 | 1 | 1 | 1 | 1 | 1 | 0 | 0 | 0 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| -2 | 2 | 1 | 1 | 1 | 1 | 1 | 1 | 1 | 1 | 1 | 1 | 1 | 0 | 0 | 0 | 1 | 1 | -1 | -1 | 1 | 0 | 0 | 0 | 1 | 1 |
| -1 | 2 | 1 | 1 | 1 | 1 | 1 | 1 | -1 | -1 | -1 | 1 | 1 | -1 | -1 | 1 | 1 | 1 | 1 | 1 | 1 | 1 | 1 | 1 | 1 | 1 |
| 0 | 2 | 1 | 1 | 0 | 0 | 0 | 1 | 1 | 1 | 1 | 0 | 0 | 0 | 1 | 1 | 1 | 1 | 1 | 1 | 1 | 1 | 1 | 1 | 1 | 1 |
| 1 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

UNITED STATES PATENT AND TRADEMARK OFFICE
CERTIFICATE OF CORRECTION

PATENT NO.   : 5,802,118
DATED        : September 1, 1998
INVENTOR(S)  : Bliss et al.

It is certified that error appears in the above-identified patent and that said Letters Patent is hereby corrected as shown below:

<u>Column 25-28,</u>
Table B9, should read

Table B9

| $S_2$ | $S_3$ | $S_0$=-2 $S_1$=-2 | -1,-2 | 0,-2 | 1,-2 | 2,-2 | -2,-1 | -1,-1 | 0,-1 | 1,-1 | 2,-1 | -2,0 | -1,0 | 0,0 | 1,0 | 2,0 | -2,1 | -1,1 | 0,1 | 1,1 | 2,1 | -2,2 | -1,2 | 0,2 | 1,2 | 2,2 |
|---|---|---|---|---|---|---|---|---|---|---|---|---|---|---|---|---|---|---|---|---|---|---|---|---|---|---|
| -2 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | -1 | 0 | 0 | 0 | 0 | 0 | 0 | 0 | 0 | 0 | 0 | 0 | -1 | -1 | -1 | 0 | 0 | 0 | 0 | 0 | -1 | -1 | -1 | 0 | 0 | 0 |
| 0 | -1 | 0 | 0 | 0 | 0 | 0 | 0 | 0 | 0 | 0 | 0 | 0 | 0 | 0 | 0 | 0 | 0 | -1 | 0 | 0 | 0 | 0 | 0 | 0 | 0 | 0 |
| 1 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | -1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 0 | 0 | 0 | 0 | 0 | 0 | 0 | 0 | 0 | 0 | 0 | 0 | -1 | -1 | -1 | 0 | 0 | 0 | 0 | 0 | -1 | -1 | -1 | 0 | 0 | 0 |
| 0 | 0 | 0 | 0 | 0 | 0 | 0 | 0 | 0 | 1 | 0 | 0 | 0 | 0 | 0 | 0 | 0 | 0 | 0 | -1 | 0 | 0 | 0 | 0 | 0 | 0 | 0 |
| 1 | 0 | 0 | 0 | 1 | 1 | 1 | 0 | 0 | 0 | 0 | 0 | 1 | 1 | 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 1 | 1 | 0 | 0 | 0 | 0 | 0 | 1 | 1 | 1 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -2 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| -1 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Signed and Sealed this

Twenty-first Day of January, 2003

JAMES E. ROGAN
*Director of the United States Patent and Trademark Office*